US012564817B2

(12) United States Patent
Taguchi et al.

(10) Patent No.: US 12,564,817 B2
(45) Date of Patent: Mar. 3, 2026

(54) SEPARATION MEMBRANE AND MANUFACTURING METHOD THEREFOR

(71) Applicant: Toray Industries, Inc., Tokyo (JP)

(72) Inventors: Marina Taguchi, Otsu (JP); Masayuki Hanakawa, Otsu (JP); Gohei Yamamura, Otsu (JP); Koichi Takada, Otsu (JP); Hiroki Eimura, Otsu (JP); Shigeru Aoyama, Otsu (JP); Miku Akutsu, Otsu (JP)

(73) Assignee: Toray Industries, Inc., Tokyo (JP)

( * ) Notice: Subject to any disclaimer, the term of this patent is extended or adjusted under 35 U.S.C. 154(b) by 382 days.

(21) Appl. No.: 18/286,779

(22) PCT Filed: Apr. 27, 2022

(86) PCT No.: PCT/JP2022/019036
§ 371 (c)(1),
(2) Date: Oct. 13, 2023

(87) PCT Pub. No.: WO2022/230923
PCT Pub. Date: Nov. 3, 2022

(65) Prior Publication Data
US 2024/0189778 A1 Jun. 13, 2024

(30) Foreign Application Priority Data

Apr. 28, 2021 (JP) ................................. 2021-075671
Apr. 28, 2021 (JP) ................................. 2021-075672

(51) Int. Cl.
| | |
|---|---|
| B01D 69/02 | (2006.01) |
| B01D 53/22 | (2006.01) |
(Continued)

(52) U.S. Cl.
CPC ........... B01D 69/02 (2013.01); B01D 53/228 (2013.01); B01D 67/002 (2013.01);
(Continued)

(58) Field of Classification Search
CPC .... B01D 69/02; B01D 53/228; B01D 67/002; B01D 67/0027; B01D 69/0871;
(Continued)

(56) References Cited

U.S. PATENT DOCUMENTS

| | | | |
|---|---|---|---|
| 6,409,921 | B1 | 6/2002 | Müller et al. |
| 6,497,752 | B1 | 12/2002 | Kessler et al. |
(Continued)

FOREIGN PATENT DOCUMENTS

| | | |
|---|---|---|
| CN | 105647032 B | 9/2018 |
| CN | 112535956 A | 3/2021 |
(Continued)

OTHER PUBLICATIONS

Extended European Search Report dated Feb. 27, 2025, from counterpart European Patent Application No. 22795836.0.
(Continued)

*Primary Examiner* — Ekandra S. Miller-Cruz
(74) *Attorney, Agent, or Firm* — DLA Piper LLP (US)

(57) ABSTRACT

A separation membrane has high strength and low leakage property while maintaining high gas permeability using poly(4-methyl-1-pentene) excellent in chemical resistance and gas permeability. The separation membrane contains poly(4-methyl-1-pentene) as a main component, in which a ratio RA of a rigid amorphous of poly(4-methyl-1-pentene) in the separation membrane is 43% or more and 60% or less, a porosity is 30% or more and 70% or less, and a dense layer is provided on at least one surface.

18 Claims, 4 Drawing Sheets

(51) Int. Cl.
    *B01D 67/00*      (2006.01)
    *B01D 69/08*      (2006.01)
    *B01D 71/26*      (2006.01)

(52) U.S. Cl.
    CPC ..... *B01D 67/0027* (2013.01); *B01D 69/0871* (2022.08); *B01D 71/26* (2013.01); *B01D 2323/081* (2022.08); *B01D 2323/12* (2013.01); *B01D 2325/0231* (2022.08); *B01D 2325/02832* (2022.08); *B01D 2325/04* (2013.01); *B01D 2325/20* (2013.01); *B01D 2325/24* (2013.01); *B01D 2325/30* (2013.01); *B01D 2325/52* (2022.08)

(58) Field of Classification Search
    CPC .............. B01D 71/26; B01D 2323/081; B01D 2323/12; B01D 2325/0231; B01D 2325/02832; B01D 2325/04; B01D 2325/20; B01D 2325/24; B01D 2325/30; B01D 2325/52; B01D 2053/224; B01D 19/0031; B01D 2325/02; B01D 53/22; B01D 69/08; C08J 2323/20; C08J 5/18; C08J 9/00; D01D 5/24; D01D 5/247; D01F 11/06; D01F 6/04
    USPC .................................................... 210/500.23
    See application file for complete search history.

(56) References Cited

U.S. PATENT DOCUMENTS

| | | |
|---|---|---|
| 2005/0145107 A1 | 7/2005 | Kessler et al. |
| 2020/0324234 A1 | 10/2020 | Sugimoto et al. |

FOREIGN PATENT DOCUMENTS

| | | |
|---|---|---|
| JP | H07-155569 A | 6/1995 |
| JP | 2015-030935 A | 2/2015 |
| WO | 03/061812 A2 | 7/2003 |
| WO | 2019/124189 A1 | 6/2019 |
| WO | 2020136560 A1 | 7/2020 |

OTHER PUBLICATIONS

Gregory R. Guillen et al., "Preparation and Characterization of Membranes Formed by Nonsolvent Induced Phase Separation: A Review," Industrial & Engineering Chemistry Research, vol. 50, Issue 7, pp. 3798-3817, Mar. 8, 2011 (Abstract).

International Search Report dated Jul. 5, 2022 in counterpart International Application No. PCT/JP2022/01936 w/English translation.

Written Opinion dated Jul. 5, 2022 in counterpart International Application No. PCT/JP2022/019036.

Longitudinal direction

SEPARATION MEMBRANE AND MANUFACTURING METHOD THEREFOR

TECHNICAL FIELD

This disclosure relates to a separation membrane and a manufacturing method therefor.

BACKGROUND

Examples of a degassing method of removing a dissolved gas from a liquid and a gas exchange method of exchanging a dissolved gas in a liquid and a gas component in a gas phase include a method using a hollow fiber membrane. Hollow fiber membranes used for such applications are required to have solvent resistance to liquids to be treated and high gas permeability, and therefore poly(4-methyl-1-pentene) excellent in these properties is sometimes used as a membrane material. Among such hollow fiber membranes, a membrane having a thin dense layer of 2.0 μm or less in the surface layer is desirable in that the permeation flow rate of a gas in the entire membrane can be increased.

On the other hand, the separation membrane having such a thin dense layer as a surface layer is not suitable for manufacturing by stretching because through-holes are formed in the thin dense layer by stretching, and the solution leaks from the holes as starting points. Furthermore, the support layer on the inner side of the surface layer of the separation membrane was a layer having a plurality of voids, and had low strength due to high porosity.

In recent years, a separation membrane having high permeability and high strength has been required. Various methods have been proposed to obtain a gas-permeable membrane having high permeability or high strength and low leakage. The low leakage property refers to difficulty in leakage of a liquid when a dissolved gas is removed from the liquid or when a dissolved gas and a gas component in the liquid are exchanged.

For example, WO 2003/061812 A discloses a dry-wet solution method using a polyolefin-based polymer. Specifically, in WO '812, a polymer solution in which a polyolefin-based polymer is dissolved in a good solvent is extruded from a spinneret at a temperature higher than the melting point of a polyolefin resin, and this polymer solution is brought into contact with a cooling solvent to form an asymmetric structure having a dense layer on one surface by thermally induced phase separation. However, the film of WO '812 is not subjected to stretching, and has a problem of insufficient strength. Furthermore, to prevent the pores of the dense layer from being largely opened by stretching, stretching should not exceed 10%, and there is a defect that only stretching at a low magnification can be performed.

Japanese Patent Laid-open Publication No. 7-155569 discloses a hollow fiber membrane formed by a melting method. Specifically, the polyolefin-based resin is extruded from a spinneret at a temperature equal to or higher than the melting point to be cooled and solidified, and then stretched to be partially cleaved to open pores in the polyolefin-based resin, thereby forming a porous structure in which the surface layer is dense and the inside is porous. In that method, a membrane having high strength and low leakage property is obtained, but there is a defect that gas permeability is not sufficient due to a structure having a low porosity.

In the separation membrane of WO '812, it is difficult to achieve high strength while maintaining practical gas permeability and low leakage property. In addition, the separation membrane obtained in JP '569 has high strength and low leakage, but has insufficient porosity, and does not have sufficient gas permeability.

It could therefore be helpful to provide a separation membrane having high strength and low leakage property while maintaining high gas permeability using poly(4-methyl-1-pentene) excellent in chemical resistance and gas permeability.

SUMMARY

We found that in a separation membrane containing poly(4-methyl-1-pentene) as a main component and having a dense layer on at least one surface, a ratio RA of a rigid amorphous of poly(4-methyl-1-pentene) in the membrane is in a specific range and the porosity is in a specific range so that it is possible to provide high strength and low leakage while maintaining high gas permeability.

We thus provide a separation membrane containing poly (4-methyl-1-pentene) as a main component, in which a ratio RA of the rigid amorphous defined by Equation (1) of poly(4-methyl-1-pentene) in the separation membrane is 43% or more and 60% or less, the overall porosity of the separation membrane is 30% or more and 70% or less, and a dense layer is provided on at least one surface side of the separation membrane:

$$RA\ (\%)=100-(MA+C) \tag{1}$$

wherein MA is the ratio of movable amorphous, and C is the degree of crystallinity.

In addition, the separation membrane is the separation membrane described above in which in a temperature-loss elastic modulus (E") curve, the loss elastic modulus (E") obtained by a dynamic viscoelasticity test has a peak at a temperature of 30.0° C. or higher and 50.0° C. or lower.

There is thus provided a separation membrane having high strength and low leakage property while maintaining high gas permeability using poly(4-methyl-1-pentene) excellent in chemical resistance and gas permeability.

DESCRIPTION OF REFERENCE SIGNS

Figure 1A:
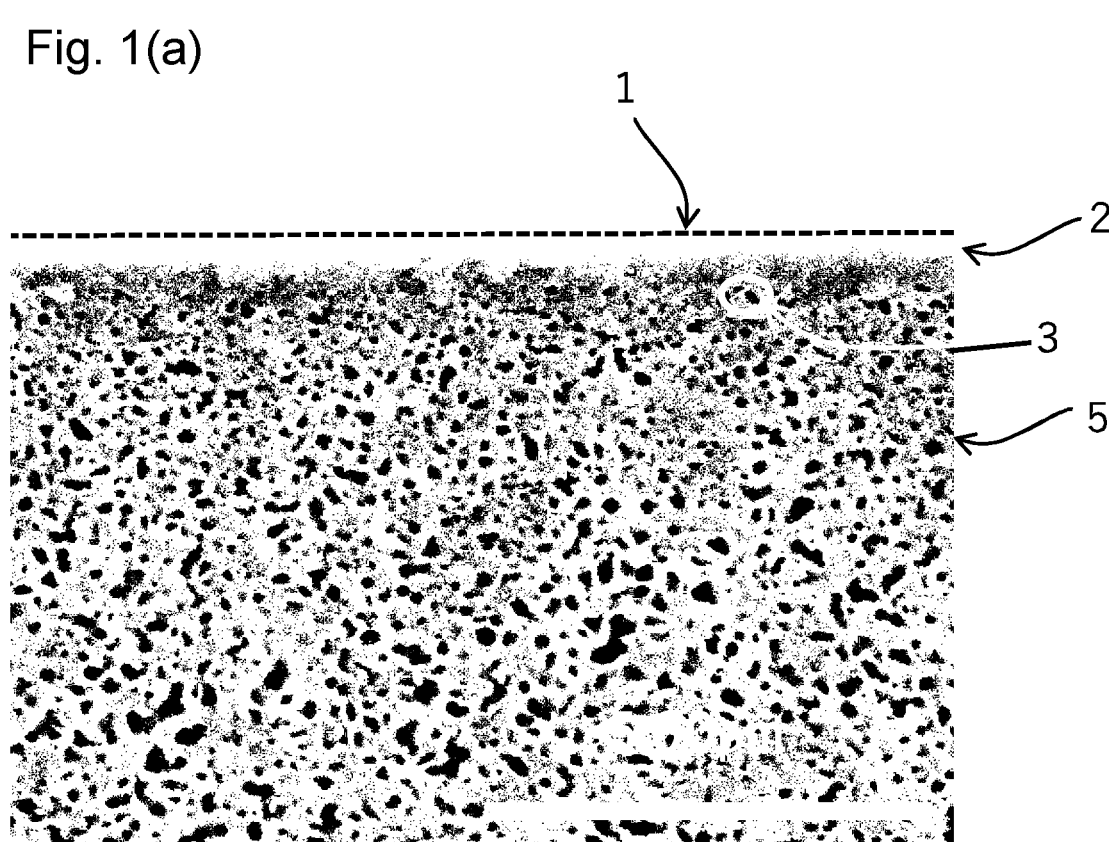
FIGS. 1(a) and 1(b) are an example of images obtained by imaging a cross section cut in a thickness direction of a separation membrane with a SEM.

1: Membrane surface
2: Dense layer
3: Void portion
4: Thickness of dense layer
5: Inner layer of separation membrane
6: Virtual variation curve of dense layer

DETAILED DESCRIPTION

Our separation membrane is a separation membrane containing poly(4-methyl-1-pentene) as a main component, in which a ratio RA of the rigid amorphous of poly(4-methyl-1-pentene) in the separation membrane is 43% or more and 60% or less, a porosity is 30% or more and 70% or less, and a dense layer is provided on at least one surface side.

The mass-based proportion (percentage, part and the like) is the same as the weight-based proportion (percentage, part and the like). Hereinafter, the resin composition constituting the separation membrane will be described.

Resin Composition Constituting Separation Membrane

The resin composition constituting the separation membrane contains poly(4-methyl-1-pentene) represented by the following (1) as a main component. In addition to (1), components shown in (2) to (3) can be contained.

(1) Poly(4-methyl-1-pentene) ("PMP")

The separation membrane needs to contain PMP as a main component. The main component as used herein refers to a component contained in the largest amount in terms of mass among all the components of the separation membrane, and is 50% by weight or more as a standard.

PMP may have a repeating unit derived from 4-methyl-1-pentene. PMP may be a homopolymer of 4-methyl-1-pentene or a copolymer with a monomer copolymerizable with 4-methyl-1-pentene other than 4-methyl-1-pentene. Specific examples of the monomer copolymerizable with 4-methyl-1-pentene include olefins having 2 or more and 20 or less carbon atoms other than 4-methyl-1-pentene ("olefins having 2 or more and 20 or less carbon atoms").

Examples of the olefin having 2 or more and 20 or less carbon atoms to be copolymerized with 4-methyl-1-pentene include ethylene, propylene, 1-butene, 1-hexene, 1-heptene, 1-octene, 1-decene, 1-tetradecene, 1-hexadecene, 1-heptadecene, 1-octadecene, and 1-eicosene.

The olefin having 2 or more and 20 or less carbon atoms to be copolymerized with 4-methyl-1-pentene may be one kind or a combination of two or more kinds.

The density of PMP is preferably 825 kg/m³ or more and 840 kg/m³ or less, and more preferably 830 kg/m³ or more and 835 kg/m³ or less. When the density is smaller than the above range, the mechanical strength of the separation membrane is reduced, and problems such as defects are likely to occur may occur. On the other hand, when the density is larger than the above range, gas permeability tends to decrease.

The melt flow rate (MFR) of PMP measured at 260° C. under a load of 5 kg is not particularly limited as long as the later-described plasticizer is easily mixed and coextrusion is possible. The MFR is preferably 1 g/10 min or more and 200 g/10 min or less, and more preferably 5 g/10 min or more and 30 g/10 min or less. When the MFR is in the above-described range, it is easy to perform extrusion molding to a relatively uniform film thickness.

PMP may be directly manufactured by polymerizing olefins, or may be manufactured by thermally decomposing a high molecular weight 4-methyl-1 pentene-based polymer. The 4-methyl-1 pentene-based polymer may be purified by a method such as solvent fractionation in which fractionation is performed based on a difference in solubility with respect to a solvent, or molecular distillation in which fractionation is performed based on a difference in boiling point. PMP may be a commercially available polymer such as TPX manufactured by Mitsui Chemicals, Inc. in addition to those manufactured by polymerizing olefins as described above.

The content of PMP in the separation membrane is preferably 70 mass % or more and 100 mass % or less, more preferably 80 mass % or more and 100 mass % or less, still more preferably 90 mass % or more and 100 mass % or less when the total components of the separation membrane is 100 mass %. When the content of PMP in the separation membrane is 70 mass % or more, gas permeability becomes sufficient.

The content of PMP in the raw material for manufacturing the separation membrane is preferably 10 mass % or more and 50 mass % or less when the total of the components constituting the raw material is 100 mass %. When the content is 10 mass % or more, the membrane strength of the separation membrane is improved. On the other hand, when the content is 50 mass % or less, the permeability of the separation membrane is improved. The content is more preferably 15 mass % or more and 50 mass % or less, still more preferably 20 mass % or more and 45 mass % or less, and particularly preferably 25 mass % or more and 40 mass % or less.

(2) Plasticizer

The resin composition constituting the separation membrane can contain a plasticizer of PMP. From the viewpoint of enhancing the permeability, the content of the plasticizer in the separation membrane is preferably 1000 ppm (mass basis) or less, more preferably 500 ppm (mass basis) or less, and particularly preferably 100 ppm (mass basis) or less.

The plasticizer of PMP is not particularly limited as long as it is a compound that thermoplasticizes PMP. As the plasticizer of PMP, not only one plasticizer but also two or more plasticizers may be used in combination.

Examples of the plasticizer of PMP include palm kernel oil, dibutyl phthalate, dioctyl phthalate, dibenzyl ether, coconut oil, and mixtures thereof. Among them, dibutyl phthalate and dibenzyl ether are preferably used from the viewpoint of compatibility and stringiness.

The plasticizer of PMP is preferably eluted from the separation membrane after the separation membrane is formed. In addition, the content of the plasticizer of PMP in the raw material for manufacturing the separation membrane is preferably 50 mass % or more and 90 mass % or less when the total of the components constituting the raw material is 100 mass %.

When the content is 90 mass % or less, the membrane strength of the separation membrane is improved. When the content is 50 mass % or more, the permeability of the separation membrane is improved. The content is more preferably 50 mass % or more and 85 mass % or less, still more preferably 55 mass % or more and 80 mass % or less, and particularly preferably 60 mass % or more and 75 mass % or less.

(3) Additive

The resin composition constituting the separation membrane may contain additives other than those described in (2) as long as the desired effects are not impaired.

Examples of the additive include resins such as cellulose ether, polyacrylonitrile, polyolefin, a polyvinyl compound, polycarbonate, poly(meth)acrylate, polysulfone or polyethersulfone or the like, organic lubricants, crystal nucleating agents, organic particles, inorganic particles, end-capping agents, chain extenders, ultraviolet absorbers, infrared absorbers, coloring inhibitors, matting agents, antibacterial agents, electrostatic removers, deodorants, flame retardants, weathering agents, antistatic agents, antioxidants, ion exchangers, antifoaming agents, coloring pigments, optical brighteners or dyes or the like.

Shape of Separation Membrane

As the shape of the separation membrane, a hollow fiber separation membrane ("hollow fiber membrane") is preferably employed. The hollow fiber membrane is preferable because the hollow fiber membrane can be efficiently filled in the module, and an effective membrane area per unit volume of the module can be increased.

For the shape of the separation membrane, that is, the thickness of the separation membrane, the outer diameter and inner diameter of the hollow fiber membrane, and the hollowness, for example, a cross section (—"radial cross section") cut in the thickness direction of the membrane by applying stress to the separation membrane sufficiently cooled in liquid nitrogen can be observed using an optical microscope or a scanning electron microscope (SEM). A specific method will be described in detail in the Examples.

The thickness of the separation membrane is preferably 10 μm or more and 500 μm or less from the viewpoint of achieving both permeability and membrane strength. The thickness is more preferably 30 μm or more, still more preferably 50 μm or more. The thickness is more preferably 200 μm or less, still more preferably 150 μm or less, and particularly preferably 100 μm or less.

The outer diameter of the hollow fiber membrane is preferably 50 μm or more and 2500 μm or less from the viewpoint of achieving both an effective membrane area when the hollow fiber membrane is filled in a module and membrane strength. The outer diameter of the hollow fiber membrane is more preferably 100 μm or more, still more preferably 200 μm or more, particularly preferably 300 μm or more. The outer diameter is more preferably 1000 μm or less, still more preferably 500 μm or less, and particularly preferably 450 μm or less.

From the relationship between the pressure loss of the fluid flowing through the hollow portion and the buckling pressure, the inner diameter of the hollow fiber membrane is preferably 20 μm or more and 1000 μm or less. The inner diameter of the hollow fiber membrane is more preferably 50 μm or more, still more preferably 100 μm or more, particularly preferably 150 μm or more. The inner diameter is more preferably 500 μm or less, still more preferably 300 μm or less, and particularly preferably 250 μm or less.

From the relationship between the pressure loss of the fluid flowing through the hollow portion and the buckling pressure, the hollowness of the hollow fiber membrane is preferably 15% or more and 70% or less. The hollowness is more preferably 20% or more, still more preferably 25% or more. The hollowness is more preferably 60% or less, still more preferably 50% or less, particularly preferably 40% or less.

The method of setting the outer diameter, the inner diameter, and the hollowness of the hollow fiber in the hollow fiber membrane within the above-described ranges is not particularly limited, and can be adjusted, for example, by appropriately changing the shape of the discharge hole of the spinneret for manufacturing the hollow fiber, the draft ratio that can be calculated by the winding speed/the discharge speed, or the idle running distance. The idle running distance referred to herein is a distance from a discharge spinneret to a cooling bath in a forming step described later.

As described later, the separation membrane can be manufactured by forming a resin molded product from a membrane-forming stock solution containing a polymer and stretching the resin molded product. For convenience, the state before stretching is referred to as "resin molded product," and the state after stretching is referred to as "separation membrane."

In the separation membrane, the thickness of the dense layer is 0.1 μm or more and 2.0 μm or less. The dense layer refers to a layer having no void in the separation membrane when observed at a magnification of 10,000 times using a scanning electron microscope (SEM), and the void refers to, for example, a pore having a diameter of 10 nm or more when a radial cross section or a longitudinal section of the separation membrane is observed at a magnification of 2,000 times using a scanning electron microscope ("SEM"). When the pore is observed as described above, the pore may look like a recess. That is, having a dense layer means that no pores having a diameter of 10 nm or more, that is, no voids are observed when the membrane surface is observed at a magnification of 2,000 to 10,000 times using a scanning electron microscope (SEM). Voids having a diameter of less than 10 nm are not easily observed by SEM observation due to the relationship of resolution. It is difficult to specify voids having a diameter of less than 10 nm even when the separation membrane is observed at a magnification of 10,000, but the dense layer of the separation membrane may have pores having a diameter of less than 10 nm, that is, minute voids. From the viewpoint of gas permeability, the diameter of voids in the dense layer is preferably small, and it is more preferable that no voids are present in the dense layer.

In addition, the thickness of the dense layer refers to, when assuming that a straight line is perpendicularly drawn from an arbitrary point on the surface having no void (for example, a membrane surface 1 of FIG. 1) toward the other surface, a length of the straight line first reaching a pore having a diameter of more than 10 nm, that is, a void, from the arbitrary point. This will be described in detail with reference to the drawings. As the separation membrane to be observed, for example, stress is applied to the separation membrane sufficiently cooled in liquid nitrogen (using a razor blade, a microtome, or a broad ion beam as necessary), and a radial cross section or a cross section parallel to the longitudinal direction of the membrane and parallel to the thickness direction ("longitudinal section") is used. Using a scanning electron microscope (SEM), a longitudinal section including a dense layer in the vicinity of the surface of the separation membrane is observed. Using the image thus obtained, the size of the void and the thickness of the dense layer can be obtained.

Figure 1B:
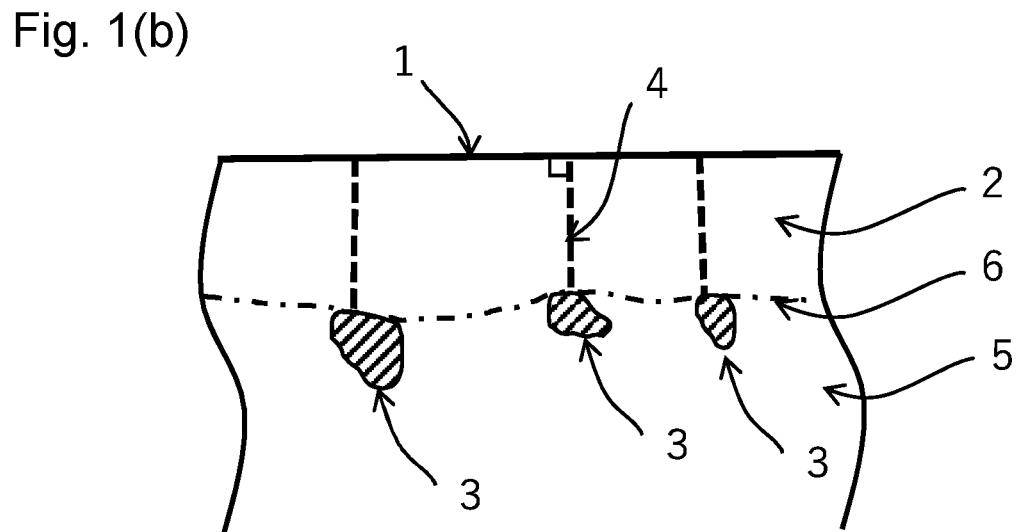

FIG. 1(a) is an example of a cross-sectional SEM image including a dense layer in the vicinity of the surface of the separation membrane. FIG. 1(a) illustrates a membrane surface 1 and void portions 3. In FIG. 1(a), voids appear darker than the periphery, and a portion of a representative void portion is marked with a reference sign 3. The dense layer 2 is on the membrane surface, and the inner layer 5 is shown as a support layer below the dense layer 2. FIG. 1(b) is a schematic view schematically showing a relationship between each of the void portions 3 and the dense layer 2. The void portions 3 are pores or recesses each having a diameter of 10 nm or more, and are portions that look darker than the periphery in FIG. 1(a). As shown in FIG. 1(b), the shortest distance from the membrane surface 1 to each void 3 is obtained as the thickness 4 of the dense layer at each point. Although not shown, the inner layer 5 of the separation membrane is a porous layer, and larger pores are present below the dense layer.

The thickness of the dense layer is obtained as the average value of the virtual variation curve 6 of the dense layer. At this time, the virtual variation curve 6 is obtained by connecting the shortest path points of the voids 3 as illustrated in FIG. 1(b). Specifically, in the extreme vicinity of the membrane surface 1, the distances to the void portions 3 observed as pores or recesses each having a diameter of 10 nm or more are measured at a plurality of points, and the average value thereof can be taken as the thickness of the dense layer. Furthermore, the coefficient of variation of the thickness of the dense layer may be determined from the variation of the virtual variation curve 6, but specifically, the coefficient of variation of the thickness of the dense layer may be determined by measuring distances to the voids 3 observed as pores or recesses each having a diameter of 10 nm or more at a plurality of points in the extreme vicinity of the membrane surface 1 and determining the variation thereof. The coefficient of variation can be calculated from the measurement results of the thicknesses of the plurality of dense layers by dividing the standard deviation by the average value and converting it into a 100 fraction.

Figure 2:
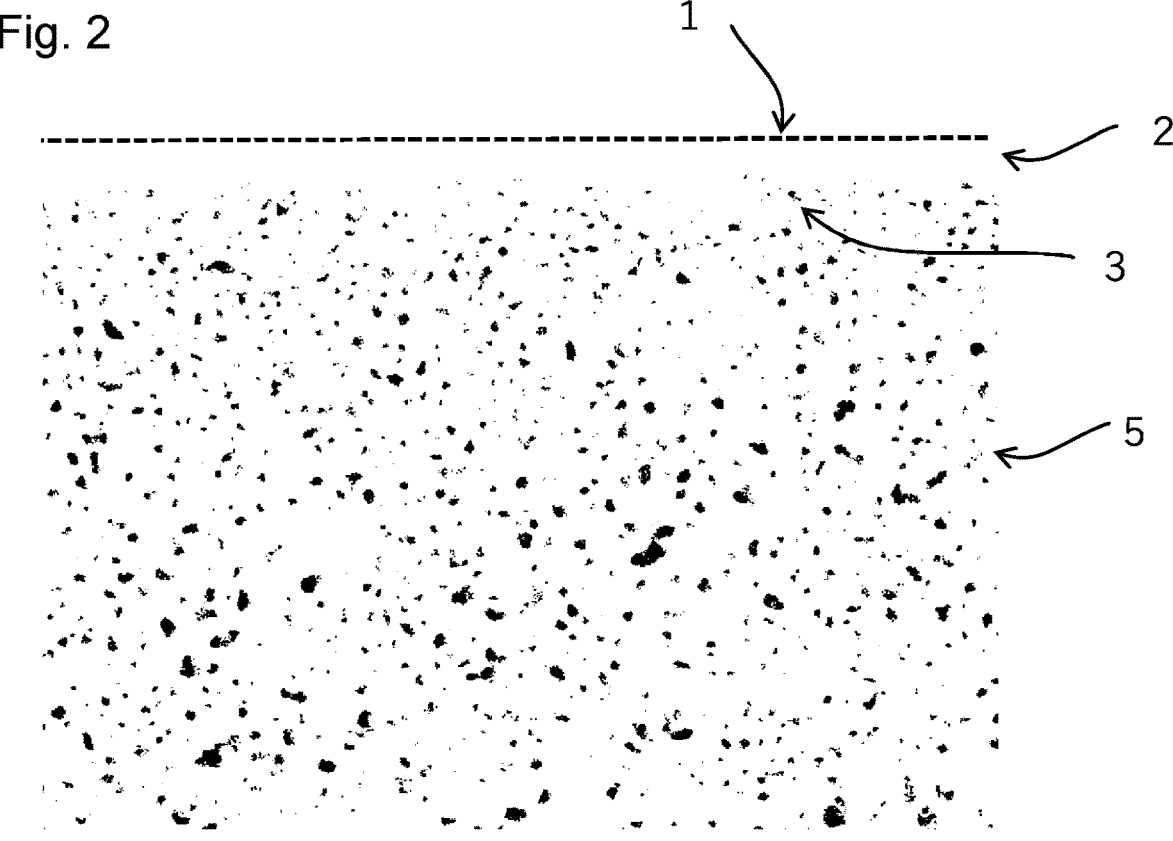
FIG. 2 is an image obtained by binarizing the image of FIG. 1 and then removing noise.
Figure 3:
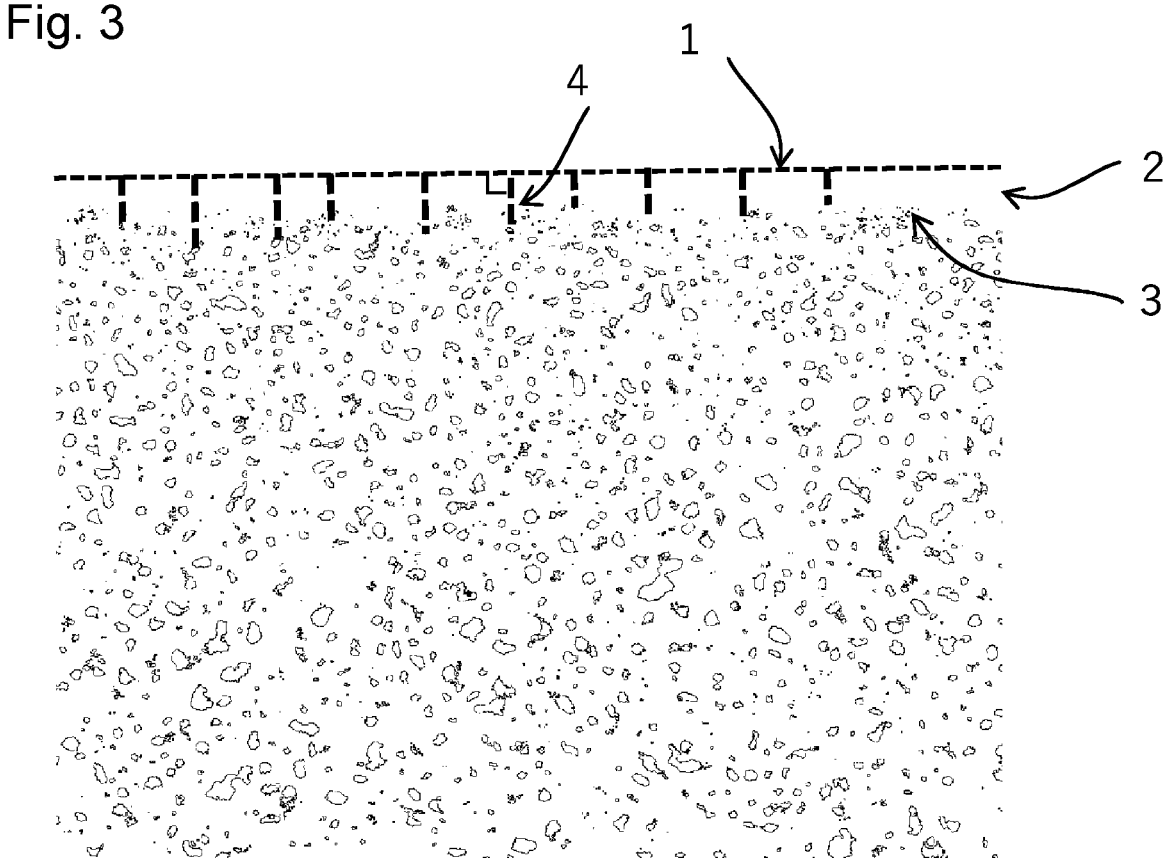
FIG. 3 is a schematic view showing a method of obtaining a thickness of a dense layer from an image.

FIGS. 2 and 3 are examples illustrating a method of specifying a void having a diameter of 10 nm or more. The obtained cross-sectional SEM image can be obtained by binarizing with image analysis software "ImageJ" and then extracting only pores larger than 10 nm. In the image after the processing shown in FIG. 2, the resin portions are white and the void portions 3 are black. The membrane surface 1 is shown in dotted lines. FIG. 3 is a processed image obtained by extracting the void portions 3 each having a diameter of 10 nm or more (an area of 78.5 nm$^2$ or more) from the processed image of FIG. 2 and displaying the boundary line. The thickness 4 of the dense layer is a distance from the membrane surface 1 to the shortest path, that is, a point at which a line segment perpendicular to the line representing the membrane surface 1 intersects the boundary line shown in FIG. 3 at each point.

The longitudinal direction is a machine direction at the time of manufacturing, and in a hollow fiber membrane, the longitudinal direction is a direction perpendicular to the radial direction. In a hollow fiber membrane, the lateral direction is a direction parallel to the radial direction, that is, it can be rephrased as an in-plane direction of the hollow surface. On the other hand, when the separation membrane is a flat membrane, it is difficult to determine the longitudinal direction from the appearance of the separation membrane. Therefore, the longitudinal direction of the flat membrane is a direction in which the separation membrane is oriented. That is, in the measurement of the orientation degree in polarized light IR described later, the direction in which the intensity is the highest is defined as the longitudinal direction of the flat film. A method of measuring the thickness of the dense layer (for example, the dense layer thickness 2 in FIG. 3) will also be described in detail in the Examples.

When the thickness of the dense layer is 0.10 μm or more, leakage resistance is improved, and when the thickness is 2.0 μm or less, permeability is improved. That is, the thickness of the dense layer is preferably 0.1 μm or more and 1.5 μm or less. The thickness of the dense layer is preferably 0.1 μm or more and 1.0 μm or less, and more preferably 0.1 μm or more and 0.4 μm or less.

In the separation membrane, the dense layer is preferably present on the outer surface. When the dense layer is present on the outer surface, the specific surface area during operation increases, and the permeability is more easily improved.

The coefficient of variation in thickness of the dense layer is preferably 80% or less, more preferably 50% or less, still more preferably 30% or less, and particularly preferably 10% or less. When the coefficient of variation is within the above-described range, both permeability and separation performance can be easily achieved. The lower limit of the coefficient of variation of the thickness of the dense layer is not particularly limited, but is usually preferably as small as possible, and most preferably 0%. Examples of the method of setting the coefficient of variation in the thickness of the dense layer within the above-described range include, but are not limited to, a method in which the draft ratio at the time of discharging the resin composition from the discharge spinneret is 1 or more and 10 or less.

The number of voids larger than 10 μm in the support layer is preferably 3 or less per membrane area. The support layer is a layer obtained by removing the dense layer in the separation membrane, and has a plurality of voids. The plurality of voids refers to 10 or more voids per visual field when the support layer in the radial cross section or the longitudinal cross section is observed at a magnification of 2,000 times using SEM. When the number of voids larger than 10 μm in the support layer is 3 or less, the strength of the separation membrane is improved. The voids of 10 μm or more in the support layer can be obtained, for example, by applying stress to the separation membrane sufficiently cooled in liquid nitrogen (using a razor or a microtome or a broad ion beam as necessary), observing the radial cross section or the longitudinal cross section using a scanning electron microscope (hereinafter referred to as SEM), binarizing the obtained image with image analysis software "ImageJ," and then extracting only pores having an average diameter larger than 10 μm. The number of voids larger than 10 μm in the support layer is more preferably 2 or less, still more preferably 1 or less, and particularly preferably 0. A method of measuring voids larger than 10 μm in the support layer will be described in detail in the Examples.

The support layer preferably has an average pore size of 100 nm or more and 1000 nm or less. The support layer refers to a porous membrane layer that is more inner than the dense layer on the surface of the separation membrane. The average pore size of the support layer can be obtained, for example, by exposing the radial cross section of the separation membrane sufficiently cooled in liquid nitrogen using a microtome, then observing the radial cross section with a scanning electron microscope (SEM), binarizing the obtained image with image analysis software "ImageJ," and then extracting only pores having an average diameter of more than 100 nm. When the average pore size of the support layer is 100 nm or more, the permeability is improved, and when the average pore size of the support layer is 1000 nm or less, the strength of the separation membrane is improved. The average pore size of the support layer is preferably 100 nm or more and 800 nm or less, more preferably 100 nm or more and 600 nm or less, still more preferably 100 nm or more and 570 nm or less, and particularly preferably 100 nm or more and 500 nm or less. A method of measuring the average pore size of the support layer will be described in detail in the Examples.

Ratio of Rigid Amorphous (RA)

Generally, a polymer has a crystalline region and an amorphous region, and among them, the amorphous region can be classified into a movable amorphous crystal exhibiting a stepwise endothermic peak accompanied by a specific heat capacity change at a glass transition point and a rigid amorphous in which a specific heat capacity change does not occur under normal conditions. It is considered that the rigid amorphous may have advanced molecular orientation or may exist as a so-called tie molecule connecting crystals.

The ratio of the rigid amorphous phase can be accurately determined from a change in specific heat capacity before and after glass transition on a TMDSC curve of a reversible component by temperature modulation differential scanning calorimetry ("TMDSC"), and a heat of fusion on a DSC curve by differential scanning calorimetry ("DSC").

It is important that the ratio RA ("rigid amorphous ratio RA") of the rigid amorphous phase of poly(4-methyl-1-pentene) in the separation membrane is 43% or more and 60% or less. The ratio RA of the rigid amorphous is determined by RA (%)=100−(MA+C), wherein MA is the ratio of movable amorphous, and C is the degree of crystallinity.

When the ratio RA of the rigid amorphous is 43% or more, the strength of the separation membrane is improved, and when the ratio RA is 60% or less, the flexibility of the separation membrane is improved. The ratio RA of the rigid amorphous is preferably 48% or more and 60% or less, more preferably 50% or more and 60% or less, and still more preferably 56% or more and 60% or less.

Examples of the method of setting the ratio RA of the rigid amorphous to 43% or more and 60% or less include a method in which the manufacturing conditions described in the method of manufacturing a separation membrane described later are set to a preferable range.

Preferable manufacturing conditions at the time of manufacturing the separation membrane for controlling the ratio RA of the rigid amorphous to 43% or more and 60% or less include employing, in the method of manufacturing the separation membrane, manufacturing conditions in which a resin molded product having a predetermined structure to be described later has a stretching magnification of 2.0 times or more and 6.0 times or less at a predetermined stretching temperature and a predetermined stretching speed. In addition, the temperature range and the heating time of the heat setting after stretching may be set to preferable ranges described later.

Porosity

The separation membrane has a porosity of 30% or more and 70% or less. The porosity is a ratio of voids when the entire membrane is PMP. When the porosity is 30% or more, the permeability is improved and when the porosity is 70% or less, the membrane strength is improved. The porosity is preferably 40% or more and 65% or less, more preferably 45% or more and 60% or less, and particularly preferably 53% or more and 60% or less. To obtain a porosity in such a range, structure formation using thermally-induced phase separation described later is preferably used. The method of measuring the porosity will be described in detail in the Examples.

Next, characteristics of the separation membrane will be described. Regarding peak temperature of loss elastic modulus (E")-temperature curve As for the loss elastic modulus (E")-temperature curve obtained by performing a dynamic viscoelasticity test (temperature dependence test) in the longitudinal direction of the membrane, it is preferable that the loss elastic modulus has a peak, and the peak temperature is 30.0° C. or higher and 50.0° C. or lower. It is considered that the peak of the loss elastic modulus (E")-temperature curve in the vicinity of this temperature region (30.0° C. or higher and 50.0° C. or lower) corresponds to the movement of the amorphous chain of PMP restrained by microcrystals. The amorphous chain restrained microcrystals hardly moves at a low temperature outside the present temperature region, but the mobility rapidly increases near this peak temperature.

The fact that the peak temperature is high, that is, the amorphous chain restrained by the microcrystals hardly moves means that the degree of restraint of the amorphous chain is large. Since the peak temperature of the loss elastic modulus (E")-temperature curve of the separation membrane is present at a high temperature of 30.0° C. or higher, it is considered that the degree of restraint of the amorphous chain by the microcrystals is large and the mobility is small, and as a result, it is considered that the strength of the membrane can be increased. When the peak temperature is 50.0° C. or lower, a decrease in permeability due to excessive restraint of the amorphous chain can be prevented, which is preferable from the viewpoint of having improved permeability.

In the loss elastic modulus (E")-temperature curve, the peak temperature of loss elastic modulus (E") is preferably 31.0° C. or more and 40.0° C. or less, more preferably 32.0° C. or more and 36.0° C. or less, and still more preferably 32.5° C. or more and 35.0° C. or less. To increase the accuracy in the measurement of the peak temperature, it is preferable to determine the peak temperature of the loss elastic modulus (E")-temperature curve for any three or more, preferably five or more membrane fragments of the separation membrane, and use the average value thereof. The method of measuring the dynamic viscoelasticity test will be described in detail in the Examples.

Examples of the method of setting the peak temperature of the loss elastic modulus (E")-temperature curve to 30.0° C. or more and 50.0° C. or less include, but are not limited to, a method in which the manufacturing conditions described in the method of manufacturing a separation membrane to be described later are set to a preferable range. Preferable manufacturing conditions at the time of manufacturing include, for example, employing, in a method of manufacturing a separation membrane, a manufacturing condition in which a resin molded product having a predetermined structure described later has a stretching magnification of 2.0 times or more and 6.0 times or less at a predetermined stretching temperature. In addition, the temperature range and the heating time of the heat setting after stretching may be set to preferable ranges described later.

Stress at 5% Elongation (F5 Value)

The separation membrane preferably exhibits an F5 value of 5.0 MPa or more at 25° C. in the longitudinal direction of the membrane. The longitudinal direction is a machine direction at the time of manufacturing. The measurement conditions of the stress at 5% elongation will be described in detail in the Examples.

The fact that the F5 value is in the above-described range means that the orientation degree of molecular chains of PMP is high. That is, since the molecular chain of PMP is highly ordered and rigid and, as a result, high membrane strength can be obtained. Examples of the method of setting the stress at 5% elongation in the longitudinal direction to 5.0 MPa or more include a method in which the stretching conditions at the time of stretching are in a preferable range described later. The stress at 5% elongation is more preferably 7.0 MPa or more, still more preferably 8.0 MPa or more, particularly preferably 9.0 MPa or more, and most preferably 9.5 MPa or more. The stress at 5% elongation in the longitudinal direction is preferably 20.0 MPa or less, and is preferably 20.0 MPa or less from the viewpoint that a decrease in permeability due to excessive orientation of molecular chains can be prevented, and improved permeability can be provided. The stress at 5% elongation is more preferably 18.0 MPa or less, still more preferably 15.0 MPa or less, and particularly preferably 13.0 MPa or less.

To increase the accuracy of the measurement, it is preferable to determine the F5 value for arbitrary five or more, preferably ten or more membrane fragments, and use the average value thereof. The method of measuring the F5 value will be described in detail in the Examples.

Crystal Orientation Degree π

The molecular chain of the polymer is preferably oriented in one direction. The certain one direction is a longitudinal direction in the separation membrane. The crystal orientation degree π of the molecular chain is 0.7 or more and less than 1.0. The crystal orientation degree π is calculated from the half-value width H(°) obtained by wide-angle X-ray diffraction measurement based on Equation (2):

$$\text{Crystal orientation degree } \pi = (180° - H)/180° \qquad (2)$$

wherein H is the half value width(°) of the diffraction intensity distribution in the circumferential direction of the wide-angle X-ray diffraction image.

The porous orientation of the molecular chain and the method of measuring the crystal orientation degree π thereof will be specifically described below. To calculate the crystal orientation degree π, the hollow fiber membrane is attached to a fiber sample stage such that the longitudinal direction of the hollow fiber membrane is vertical.

When X-ray diffraction is performed, an annular diffraction image called Debye-Scherrer ring is obtained. In the non-oriented sample, a large change in the diffraction intensity is not observed along the Debye-Scherrer ring, but in the oriented sample, a bias occurs in the intensity distribution on the Debye-Scherrer ring. Therefore, the orientation degree can be calculated from the intensity distribution on the basis of Equation (2).

More specifically, when the molecular chains are not oriented, when a 2θ/θ scan is performed in the lateral direction (that is, when a diffraction pattern showing a diffraction intensity distribution in the radial direction of the Debye-Scherrer ring is obtained), a peak is observed at a diffraction angle 2θ=5° or more and 30° or less. The abscissa of the diffraction pattern obtained at this time is the X-ray diffraction angle 2θ, and the ordinate is the diffraction intensity. A diffraction pattern in which the abscissa indicates the azimuth angle β and the ordinate indicates the diffraction intensity is obtained by scanning the sample in the direction of the azimuth angle β while fixing the diffraction angle 2θ to a peak position with high diffraction intensity in the diffraction pattern in which the abscissa indicates the diffraction angle 2θ of the X-ray and the ordinate indicates the diffraction intensity. In the non-oriented sample, the diffraction intensity is substantially constant over the entire 360° of the c in the circumferential direction. In the diffraction pattern in which the abscissa is the diffraction angle 2θ of the X-ray and the ordinate is the diffraction intensity, the value of the diffraction angle 2θ at which the peak position, that is, the peak is observed varies depending on the type, structure, and formulation of the polymer. In the α crystal of PMP, a diffraction peak derived from the (200) plane, that is, a plane parallel to the molecular chain is observed in the vicinity of 2θ=10°. The value of 2θ when the sample is scanned in the azimuthal angle β direction is the position of the diffraction peak derived from the (200) plane in the α crystal of PMP. The positions of diffraction peaks derived from the plane (200) are 10° and 20°. Hereinafter, a specific method of measuring the crystal orientation degree π will be described below.

Figure 4:
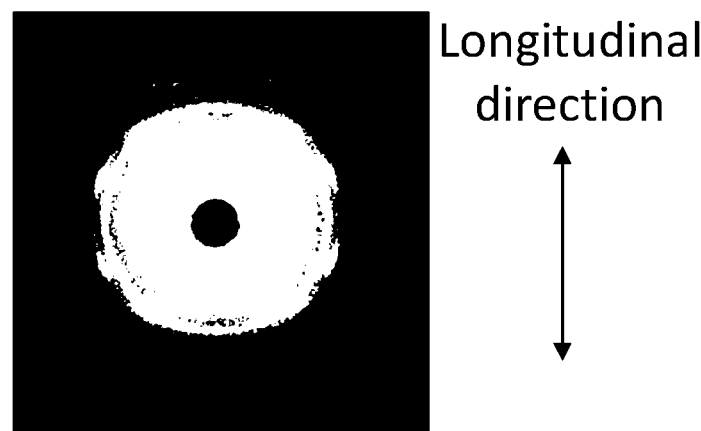
FIG. 4 is a two-dimensional diffraction image of wide-angle X-rays of a hollow fiber membrane.
Figure 5:
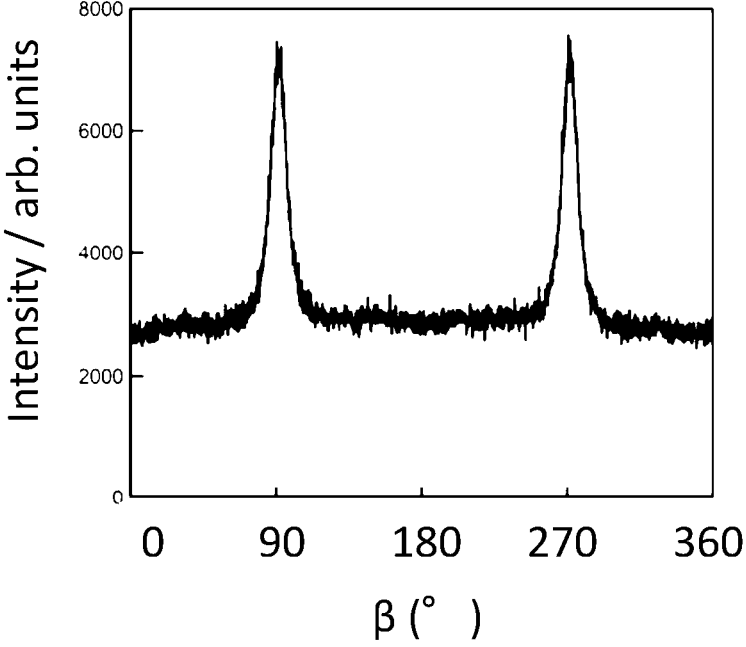
FIG. 5 is a diagram showing an intensity distribution in an azimuthal angle direction at 2θ=9.7° of a hollow fiber membrane.

When the molecular chains are oriented in the longitudinal direction, strong diffraction intensity is observed on the azimuth angle β corresponding to the short direction of the separation membrane on the Debye ring in the vicinity of 2θ=10° (that is, on the equator), and small diffraction intensity is obtained in the other part (for example, FIG. 4). That is, in the oriented sample, a diffraction peak is observed in the vicinity of 2θ=10° in the diffraction intensity distribution in the radial direction of the Debye-Scherrer ring in the same way as the non-oriented sample, and in the distribution in the circumferential direction, a diffraction peak is observed on the azimuth angle β corresponding to the short direction of the separation membrane unlike the non-oriented sample. For example, FIG. 5 is a diagram showing the intensity distribution in the direction of the azimuth angle β at 2θ=10° of the hollow fiber membrane of Example 4, and peaks are observed in the vicinity of β=90° and in the vicinity of 270° in this diagram.

As described above, by fixing the value of the diffraction angle 2θ and further measuring the intensity from 0° to 360° in the direction of the azimuth angle β (circumferential direction), the intensity distribution in the direction of the azimuth angle β is obtained. This intensity distribution is an intensity distribution obtained by scanning a crystal peak in a diffraction image in a circumferential direction thereof. In the β scan, when the intensity ratio between the maximum intensity and the minimum intensity is 0.80 or less or 1.25 or more, it is considered that there is a peak, and the half-value width H at the position of half the peak height is determined in the intensity distribution in the azimuthal angle direction.

The crystal orientation degree π is calculated by substituting the half-value width H into the above described Equation (2). The crystal orientation degree π of the separation membrane is 0.7 or more and less than 1.0, preferably 0.8 or more and less than 1.0, and more preferably 0.9 or more and less than 1.0. When the crystal orientation degree π is 0.7 or more, the mechanical strength of the separation membrane is increased. The crystal orientation degree π is preferably 0.4 or more and less than 1.0 at 80% or more of measurement points when wide-angle X-ray diffraction measurement is performed at measurement points at intervals of 1 cm in the longitudinal direction of the separation membrane.

In the intensity distribution obtained by scanning the crystal peak in the circumferential direction, when the ratio of the maximum intensity to the minimum intensity is more than 0.80 and less than 1.25, it is considered that there is no peak. That is, in this example, it is determined that the separation membrane is not oriented.

The half-value width H is preferably obtained from an intensity distribution obtained by circumferentially scanning a crystal peak (2θ=10°) derived from the (200) plane of the α crystal of PMP by wide-angle X-ray diffraction measurement.

As a means of setting the crystal orientation degree π of the molecular chain within the above-described range, for example, in a method of manufacturing a separation membrane, a method in which a draft ratio when the resin composition is discharged from a discharge spinneret is set within a range of 1 or more and 10 or less, and the resin composition is stretched at a magnification of 3 times or more and 6 times or less at a temperature higher by 10° C. or more than the glass transition temperature of the thermoplastic resin and 100° C. or less than the glass transition temperature of the thermoplastic resin can be mentioned. The crystal orientation degree π of the molecular chain can be increased, for example, by setting higher stretching magnification.

Orientation Degree of Outer Surface

The orientation degree of the outer surface in the longitudinal direction is preferably 1.3 or more and 3.0 or less. The outer surface as used herein refers to a longer surface among two surfaces parallel to the film thickness direction in the radial cross section of the separation membrane. For example, it refers to a surface on the outer diameter side in the hollow fiber membrane. On the other hand, in a flat film, since the lengths of the two surfaces are equal to each other, a surface having a high orientation degree among the two surfaces parallel to the film thickness direction is defined as an outer surface for convenience. In the radial cross section of the separation membrane, the other surface parallel to the film thickness direction with respect to the outer surface is referred to as an inner surface. That is, a surface on the inner diameter side in the hollow fiber membrane and a surface having a low orientation degree among two surfaces parallel to the film thickness direction in the flat membrane are defined as inner surfaces. When the orientation degree of the outer surface is 1.3 or more, the membrane strength is improved. When the orientation degree of the outer surface of the separation membrane is 1.4 or more and 1.7 or more, a higher effect can be obtained.

On the other hand, when the orientation degree of the outer surface is 3.0 or less, the flexibility of the separation membrane is improved. The orientation degree of the outer surface of the separation membrane is preferably 2.8 or less and 2.5 or less.

The orientation degree can be determined by orientation analysis by polarized infrared spectroscopy ("polarized light IR"). A specific method will be described in detail in the Examples.

Ratio of Orientation Degree of Outer Surface to Orientation Degree of Inner Surface The ratio of the orientation degree of the outer surface to the orientation degree of the inner surface is preferably 1.0 or more and 1.5 or less. When the ratio of the orientation degree of the outer surface to the orientation degree of the inner surface is 1.5 or less, $CO_2/N_2$ selectivity is improved. On the other hand, when the ratio of the orientation degree of the outer surface to the orientation degree of the inner surface is 1.0 or more, the strength of the separation membrane is improved. The ratio of the orientation degree of the outer surface to the inner surface is preferably 1.0 or more and 1.4 or less, and more preferably 1.0 or more and 1.3 or less. The method of measuring the orientation degree will be described later in the Examples.

Gas Permeability

The separation membrane preferably has $N_2$ permeability of 5 GPU or more at 100 kPa and 37° C. The $N_2$ permeability is more preferably 10 GPU or more, still more preferably 50 GPU or more, particularly preferably 100 GPU or more, and still more preferably 200 GPU or more. The calculation method will be described in detail in the Examples.

$CO_2/N_2$ Selectivity

Since the dense layer is non-porous, it has a very long leakage time, and because it is non-porous, permeation of gas is performed by a dissolution-diffusion mechanism. On the other hand, in the porous structure, since the porous structure has through-holes, the porous structure has a short leakage time, and the gas permeates through the porous structure due to Knudsen diffusion. That is, the denseness of the dense layer can be evaluated by the gas separation coefficient, and in a membrane having high denseness, the leakage time tends to be long.

In general, the permeation in a polymer membrane depends on the pore size in the membrane. In a membrane in which the maximum pore size of the dense layer is 3 nm or less, gas permeates through a dissolution-diffusion mechanism. In this example, the permeation coefficient of the two gases or the separation coefficient $\alpha$ indicating the ratio of the gas flow rate Q depends only on the polymer material, and does not depend on the thickness of the dense layer. Therefore, for example, the gas separation coefficient $\alpha_0(CO_2/N_2)$ for $CO_2$ and $N_2$ can be expressed as $P_0(CO_2)/P_0(N_2)$. Commonly used polymers produce $\alpha_0(CO_2/N_2)$ values of at least 1 or more.

On the other hand, in the porous membrane having pores with a size of 3 nm or more and 10 μm or less, the gas permeates mainly by "Knudsen diffusion." In this example, the gas permeation coefficient $\alpha1$ is obtained by the square root of the ratio of the molecular weight of the gas. Therefore, $\alpha_1(CO_2/N_2)$ is $\sqrt{28/44}=0.80$. Knudsen diffusion may cause leakage, and when $\alpha_1(CO_2/N_2)$ is 1 or more, the leakage risk is reduced and thus is preferable. In particular, when the thickness of the dense layer is as thin as 0.1 μm or more and 3.0 μm or less as described above, the $CO_2/N_2$ selectivity is 1.0 or more, and the low leakage property is improved. When the gas permeates through a membrane having a microporous support structure and a dense layer with defects, the apparent permeability coefficient increases on the one hand, but the gas separation coefficient decreases on the other hand.

The defects referred to herein is a pore having a size of 3 nm or more on the surface of the dense layer. Therefore, the presence or absence of pores and defects in the dense layer of the membrane can be read by the gas permeation coefficient $\alpha(CO_2/N_2)$ measured for $CO_2$ and $N_2$. When the gas permeation coefficient $\alpha(CO_2/N_2)$ is smaller than 1, this membrane has a large number of pores or defects in the dense layer. If there are a large number of pores or defects in the dense layer, premature liquid leakage or plasma leakage will occur and this membrane is not suitable for prolonged use. Similarly, such membranes cannot be used for applications in the region of gas separation. On the other hand, when the gas permeation coefficient $\alpha(CO_2/N_2)$ is 1.0 or more, this membrane has a low leakage property. Therefore, the gas permeation coefficient $\alpha(CO_2/N_2)$ of the membrane is preferably 1.0 or more, more preferably 1.5 or more, and still more preferably 2 or more.

Tensile Elastic Modulus

The separation membrane preferably has a tensile elastic modulus of 100 MPa or more in the longitudinal direction. When the tensile elastic modulus is 100 MPa or more, improved strength can be maintained during use. The tensile elastic modulus is more preferably 200 MPa or more, still more preferably 250 MPa or more, particularly preferably 300 MPa or more. A method of measuring the tensile elastic modulus of the separation membrane will be described in detail in the Examples.

Method of Manufacturing Separation Membrane

The method of manufacturing a separation membrane includes (1) to (3):

(1) A preparation step of melt-kneading a mixture containing 10 mass % or more and 50 mass % or less of PMP and 50 mass % or more and 90 mass % or less of a plasticizer to obtain a resin composition.

(2) A molding step of discharging the resin composition from a discharge spinneret, cooling the resin composition in a cooling bath, and winding the resin composition at a draft ratio of 1 or more and 10 or less to obtain a resin molded product having an orientation degree of an outer surface of 1.0 or more and 1.5 or less, and a ratio of the orientation degree of the outer surface to the orientation degree of an inner surface of 1.0 or more and 1.5 or less.

(3) A stretching step of stretching the resin molded product at a magnification of 2 times or more and 6 times or less under a temperature condition of 60° C. or more and 120° C. or less to obtain a stretched product.

Next, the method of manufacturing a separation membrane will be specifically described by taking as an example of when the separation membrane is a hollow fiber membrane.

Preparation Step

In a preparation step of obtaining a resin composition for manufacturing the separation membrane, a mixture containing 10 mass % or more and 50 mass % or less of PMP and 50 mass % or more and 90 mass % or less of a plasticizer is melt-kneaded. The mixture preferably contains 15 mass % or more and 50 mass % or less of PMP and 50 mass % or more and 85 mass % or less of plasticizer, more preferably 20 mass % or more and 45 mass % or less of PMP and 55 mass % or more and 80 mass % or less of plasticizer, and particularly preferably 25 mass % or more and 40 mass % or less of PMP and 60 mass % or more and 75 mass % or less of plasticizer.

As an apparatus used for melt-kneading the mixture, a kneader, a roll mill, a Banbury mixer, or a mixer such as a uniaxial or biaxial extruder can be used. Among them, the use of a twin-screw extruder is preferable from the viewpoint of improving uniform dispersibility of the plasticizer, and the use of a twin-screw extruder with vent holes is more preferable from the viewpoint of being able to remove volatiles such as moisture and low molecular weight substances. In addition, from the viewpoint of enhancing the kneading strength and improving the uniform dispersibility of the plasticizer, it is preferable to use a twin-screw extruder including a screw having a kneading disk part.

The resin composition obtained in the preparation step may be pelletized once and melted again to be used for melt film formation, or may be directly led to a spinneret to be used for melt film formation. When pellets are pelletized once, it is preferable to use a resin composition in which the pellets are dried to adjust the water content to 200 ppm (mass basis) or less. When the water content is 200 ppm (mass basis) or less, deterioration of the resin can be prevented.

Forming Step

In the step of forming a separation membrane, a resin molded product is obtained from a molten mixture of PMP and a plasticizer, that is, a resin composition, using phase separation. Specifically, the step is a step of discharging the resin composition obtained in the preparation step into a gas atmosphere from, for example, a discharge spinneret having a double annular nozzle in which a gas flow path is disposed in a central portion, and introducing the resin composition into a cooling bath to phase-separate the resin composition, thereby obtaining a resin molded product.

As a specific method, the hollow portion forming gas is discharged from the inner ring of the double tubular spinneret while the resin composition in a molten state is discharged from the tube outside the double annular nozzle for spinning. The resin composition thus discharged is cooled and solidified in a cooling bath to obtain a resin molded product.

A cooling bath for cooling the resin composition discharged from the discharge spinneret will be described. The solvent of the cooling bath is preferably selected from the affinity with PMP and the plasticizer. As the solvent of the cooling bath, a solvent in which the three-dimensional Hansen solubility parameter distance Ra to PMP is 5 or more and 13 or less and the three-dimensional Hansen solubility parameter distance Rb to the plasticizer is 4 or more and 10 or less is preferably used for the cooling bath, and a solvent in which Ra is 10 or more and 12 or less and Rb is 4 or more and 6 or less is more preferably used for the cooling bath. When Ra and Rb are in the above range, the dense layer can be thinned, and the permeability is improved. When Ra is 10 or more and 12 or less and Rb is 4 or more and 6 or less, the dense layer can be particularly thinned so that the permeability is improved. Furthermore, when the ratio of the orientation degree of the outer surface to the orientation degree of the inner surface of the resin molded product described later is 1.0 or more and 1.5 or less and the orientation degree of the outer surface is 1.0 or more and 1.5 or less, stretching at high magnifications can be particularly performed. The reason for this is presumed to be that solidification occurs prior to crystallization of PMP as Ra is 10 or more and 12 or less, and the solvent and the plasticizer are rapidly exchanged as Rb is 4 or more and 6 or less, and as a result, the thin layer is formed while excessive crystallization is suppressed. As a result, it is considered that the permeability is improved, and stretching at high magnifications is also possible.

The affinity of PMP for a solvent can be estimated by three-dimensional Hansen solubility parameters. Three-dimensional Hansen solubility parameters are described in Gregory R. [Ind. Eng. Chem. Res. 2011, 50, 3798-3817.]. Specifically, the smaller the solubility parameter distance (Ra) in Equation (3), the higher the affinity of the solvent for PMP:

$$Ra=\sqrt{4(\delta_{Ad}-\delta_{Cd})^2+(\delta_{Ap}-\delta_{Cp})^2+(\delta_{Ah}-\delta_{Ch})^2} \qquad (3)$$

wherein $\delta_{Ad}$, $\delta_{Ap}$, and $\delta_{Ah}$ are a dispersion term, a polarity term, and a hydrogen bond term of the solubility parameter of PMP, and $\delta_{Cd}$, $\delta_{Cp}$, and $\delta_{Ch}$ are a dispersion term, a polarity term, and a hydrogen bond term of the solubility parameter of the solvent.

The affinity between the plasticizer and the cooling solvent can also be estimated in the same manner. Specifically, the smaller the solubility parameter distance (Rb) in Equation (4), the higher the affinity of the solvent for the plasticizer:

$$Rb=\sqrt{4(\delta_{Bd}-\delta_{Cd})^2+(\delta_{Bp}-\delta_{Cp})^2+(\delta_{Bh}-\delta_{Ch})^2} \qquad (4)$$

wherein $\delta_{Bd}$, $\delta_{Bp}$, and $\delta_{Bh}$ are a dispersion term, a polarity term, and a hydrogen bond term of the solubility parameter of PMP, and $\delta_{Cd}$, $\delta_{Cp}$, and $\delta_{Ch}$ are a dispersion term, a polarity term, and a hydrogen bond term of the solubility parameter of the solvent.

When the solvent is a mixed solvent, the solubility parameter ($\delta_{Mixture}$) of the mixed solvent can be determined by Equation (5):

$$\delta_{Mixture}=\Sigma\phi_i\delta_i \qquad (5)$$

wherein $\phi_i$ and $\delta_i$ are a volume fraction and a solubility parameter of the component i, and satisfy a dispersion term, a polarity term, and a hydrogen bond term, respectively. The "volume fraction of the component I" refers to the ratio of the volume of the component i before mixing to the sum of the volumes of all the components before mixing. As the three-dimensional Hansen solubility parameter of the solvent, this value was used when it is described in Gregory R. [Ind. Eng. Chem. Res. 2011, 50, 3798 3817.]. For solvent parameters not described, values contained in the software "Hansen Solubility Parameter in Practice" developed by Charles Hansen et al. were used. The three-dimensional Hansen solubility parameter of a solvent or polymer not described in the software can be calculated by the Hansen sphere method using the software.

In the method of manufacturing a separation membrane, when dibutyl phthalate is used as the plasticizer, triacetin and N-methylpyrrolidone are preferable as the solvent used in the cooling bath in the formation step, and among them, N-methylpyrrolidone is more preferable because Ra and Rb are within the above-mentioned more preferable ranges.

In addition, it is preferable that the resin composition discharged from the discharge spinneret is exposed to a gaseous atmosphere that promotes evaporation of the plasticizer before cooling, that is, an atmosphere in which evaporation of the plasticizer can occur, on at least one surface of the surfaces, preferably a surface on which a dense layer is to be formed. The gas used for forming the gaseous atmosphere is not particularly limited, but air or nitrogen is preferably used. The gaseous atmosphere generally has a temperature lower than the discharge spinneret temperature. In this example, to evaporate a sufficient amount of the plasticizer, it is preferable to expose at least one surface of the surfaces of the molded body to the gaseous atmosphere for at least 0.5 milliseconds (ms).

In the forming step of manufacturing the separation membrane, the resin composition discharged from the discharge spinneret is wound up by a winding device. In this example, it is important that the value of the draft ratio calculated by (winding speed)/(discharge speed from discharge spinneret) by the winding device is 1 or more and 10 or less. The value of the draft ratio is more preferably 1 or more and 8 or less, and still more preferably 1 or more and 6 or less. When the draft ratio is 1 or more, winding is stabilized, and fluctuation in the yarn shape is reduced. When the draft ratio is 10 or less, excessive stretching of the resin composition discharged from the spinneret can be prevented, and the orientation of molecular chains on the outer surface is prevented so that the resin composition can be stretched at high magnifications in the stretching step described later.

Specifically, the orientation of the molecular chains by drafting occurs when the resin composition is stretched due to the winding speed being faster than the discharge speed, but when the resin composition is in a cooling bath during stretching, the outer surface side directly in contact with the cooling bath is solidified first so that the outer surface side is stretched while solidifying, and the molecular chains are strongly oriented. On the other hand, on the inner surface side of the separation membrane that is not in contact with the cooling bath, since the separation membrane is stretched before solidification proceeds, orientation is less likely to be applied. As described above, when the draft ratio is large, the orientations of the outer surface side and the inner surface side of the resin molded product before stretching become non-uniform. When such a resin molded product is stretched, the outer surface side which is already oriented cannot withstand being stretched at high magnifications, which causes defects.

We found that stretching at high magnifications is possible when the ratio of the orientation degree of the outer surface to the orientation degree of the inner surface of the resin molded product before stretching is 1.0 or more and 1.5 or less, and the orientation degree of the outer surface is 1.0 or more and 1.5 or less. The ratio of the orientation degree of the outer surface to the inner surface of the resin molded product before stretching is preferably 1.0 or more and 1.4 or less, more preferably 1.0 or more and 1.3 or less, and still more preferably 1.0 or more and 1.2 or less. When the ratio of the orientation degree of the outer surface to the orientation degree of the inner surface of the resin molded product before stretching is 1.5 or less, it is possible to achieve both preventing the generation of defects on the surface and stretching at a magnification of 2.0 times or more. On the other hand, when the ratio of the orientation degree of the outer surface to the orientation degree of the inner surface is 1.0 or more, the yarn deformation during stretching can be prevented. The orientation degree of the outer surface of the resin molded product before stretching is preferably 1.0 or more and 1.4 or less, more preferably 1.0 or more and 1.3 or less, and still more preferably 1.0 or more and 1.2 or less.

When the orientation degree of the outer surface of the resin molded product before stretching is 1.5 or less, it is possible to achieve both preventing the generation of defects on the surface and stretching at 2.0 times or more. On the other hand, when the orientation degree of the outer surface is 1.0 or more, the yarn deformation during stretching can be prevented. The method of measuring the orientation degree will be described later in the Examples.

As an example, a resin molded product in which the ratio of the orientation degree of the outer surface to the orientation degree of the inner surface was 1.5 or more was stretched to control the rigid amorphous structure, but it was difficult to uniformly stretch the resin molded product, and the rigid amorphous structure could not be controlled so that $CO_2/N_2$ selectivity was lowered.

In general, in a separation membrane having a large number of void portions, for example, a separation membrane having a porosity of 30% or more, the fracture of the structure proceeds with the void portion as a starting point during stretching, and thus stretching itself is very difficult. In particular, when the separation membrane has a phase separation structure obtained by dry-wet spinning using the principle of nonsolvent-induced phase separation or heat-induced phase separation, this tendency is evident because there are many fine voids and the porosity is high.

In a resin molded product in which the ratio of orientation degree of the outer surface to the orientation degree of the inner surface exceeds 1.5, it is difficult to stretch the resin molded product at a magnification of 2.0 times or more, and as a result of intensive studies on the cause, the winding speed is as high as 72 m/min, and as a result, the draft ratio tends to increase, and as described above, the orientation of the outside and the inside of the resin molded product before stretching becomes non-uniform. That is, we found that the stretching at high magnifications cannot be performed since the ratio of the orientation degree of the outer surface to the orientation degree of the inner surface becomes large, the surface already oriented cannot withstand being stretched at high magnifications, and thus defects occur (that is, $CO_2/N_2$ selectivity is 1 or less).

On the other hand, we found that when the resin molded product has the ratio of the orientation degree of the outer surface to the orientation degree of the inner surface within a predetermined range and the orientation degree of the outer surface of 1.5 or less, the whole of the resin molded product can be uniformly stretched so that the resin molded product can be stretched at high magnifications of 2.0 times or more. Then, by such uniform and high magnification stretching, the ratio of the rigid amorphous phase was successfully controlled, and the strength was successfully increased while the generation of defects was prevented.

Washing Step

By immersing the thus obtained resin composition in a solvent that does not dissolve the polymer but is miscible with the plasticizer, a porous structure can be obtained inside through a step of eluting the plasticizer. At this time, by using a solvent or a mixed solvent having moderate affinity with the plasticizer, good solvent exchange is performed, and the washing efficiency is increased. Although the solvent is not particularly limited as long as it does not dissolve the polymer but is miscible with the plasticizer, as a specific example, methanol, ethanol, isopropanol, and acetone are preferably used.

Drying Step

The resin composition after the washing step is preferably subjected to a drying step for the purpose of removing the solvent attached in the washing step. It is preferable that the above-described drying is performed at a temperature at which a solvent that does not dissolve the polymer but is miscible with the plasticizer is vaporized and can be removed, and specifically, the drying is performed at room temperature or more and 150° C. or less.

Stretching Step

The formed resin molded product may be wound once, unwound again, and used for stretching, or may be directly led to a stretching step and stretched. It is important to undergo the stretching step in terms of controlling the ratio RA of the rigid amorphous phase to the above-mentioned range. The stretching method is not particularly limited, and may be, for example, a method in which the temperature of the resin molded product is raised to a temperature at which stretching is performed by conveying the resin molded product on a heating roll, and stretching is performed using a peripheral speed difference between rolls, or a method in which the temperature of the resin molded product is raised to a temperature at which stretching is performed by conveying the resin molded product in a dry heat oven or in a liquid bath, and stretching is performed using a peripheral speed difference between rolls. Among them, it is preferable to convey in a dry heat oven or in a liquid bath from the viewpoint of preventing collapse of the hollow portion and increasing the hollowness. In addition, stretching may be performed before the plasticizer is eluted, or may be performed after the plasticizer is eluted, but it is preferable to perform stretching after the plasticizer is eluted from the viewpoint of reducing the residual solvent in the separation membrane and increasing the porosity.

The preferable range of the stretching temperature in the stretching step is 60° C. or more and 120° C. or less, more preferably 70° C. or more and 110° C. or less, and still more preferably 75° C. or more and 90° C. or less. By being stretched in an atmosphere of 60° C. or higher, the molded product can be stably and homogeneously stretched. By being stretched in an atmosphere of 120° C. or lower, the yarn deformation due to softening of PMP can be prevented and a decrease in hollowness can be prevented. The stretching magnification is preferably 2.0 times or more and 6.0 times or less, more preferably 3.0 times or more and 6.0 times or less, still more preferably 3.5 times or more and 6.0 times or less, particularly preferably 4.5 times or more and 6.0 times or less. We found that by setting the stretching temperature to 60° C. or higher and 120° C. or lower and setting the stretching magnification to 2.0 times or higher and 6.0 times or lower, the ratio (RA) of the above-described rigid amorphous phase can be controlled within a preferable range, and improved membrane strength can be obtained. In addition, by setting the stretching magnification to 6.0 times or less, generation of through-holes in the dense layer can be prevented.

Heat Treatment Step

Subsequently, the separation membrane can be heat-treated by being heated at 100° C. or more and 200° C. or less. Through this heat treatment step, the crystallinity of PMP can be increased, and a separation membrane having more excellent strength can be obtained. The heat treatment may be performed by conveying the target on a heating roll, or conveying the target through a dry heat oven, or by putting the target in a dry heat oven in the form of a roll wound around a bobbin, a paper tube or the like.

The heat treatment temperature is preferably 100° C. or higher and 200° C. or lower, more preferably 110° C. or higher and 180° C. or lower, still more preferably 120° C. or higher and 160° C. or lower. The heat treatment time is preferably 1 second or more and 600 seconds or less, more preferably 5 seconds or more and 300 seconds or less, still more preferably 10 seconds or more and 60 seconds. The separation membrane including the above steps and containing PMP as a main component can be manufactured.

EXAMPLES

Hereinafter, our membranes and methods will be described more specifically with reference to examples, but this disclosure is not limited thereto at all. The measurement and evaluation methods are shown below.

The values of the characteristics in the examples were determined by the following methods.

(1) Outer Diameter and Inner Diameter (μm) of Hollow Fiber Membrane

After the hollow fiber membranes were frozen with liquid nitrogen, a stress was applied (using a razor or a microtome as necessary), and the exposed radial cross sections were observed with an optical microscope. The average values of the outer diameter and the inner diameter at ten randomly selected points were taken as the outer diameter and the inner diameter of the hollow fiber membranes, respectively.

(2) Hollowness (%) of Hollow Fiber Membrane

From the outer diameter and the inner diameter determined in the above (1), the hollowness of the hollow fiber membrane was calculated by equation:

$$\text{Hollowness } (\%) = 100 \times [\text{inner diameter } (\mu m)]^2 / [\text{outer diameter } (\mu m)]^2.$$

(3) Gas Permeability (GPU)

A small module having an effective length of 100 mm composed of one hollow fiber membrane was prepared. The gas permeation rate was measured using this small module. As the measurement gas, carbon dioxide or nitrogen was used alone for evaluation, and the pressure change on the permeate side per unit time of carbon dioxide or nitrogen was measured by an external pressure method at a measurement temperature of 37° C. in accordance with the pressure sensor method of JIS K7126-1(2006). The pressure difference between the supply side and the permeation side was set to 100 kPa.

Subsequently, the gas permeation rate Q was calculated by the equation below. In addition, the ratio of the gas permeation rate of each component was defined as the separation coefficient α. The membrane area was calculated from the outer diameter and length in the region contributing to gas permeation.

$$\text{Permeation rate } Q(\text{GPU}) = 10^{-6} \, [\text{permeation gas amount } (\text{cm}^3)] / [\text{membrane area } (\text{cm}^2) \times \text{time } (s) \times \text{pressure difference } (\text{cmHg})]$$

(4) Thickness of Dense Layer (μm)

In the same manner as in the above-described (1) Outer diameter and inner diameter (μm) of the hollow fiber membrane, the separation membrane was frozen with liquid nitrogen, and then a stress was applied (using a razor blade, a microtome, or a broad ion beam as necessary) to cut the hollow fiber membrane such that a radial cross section or a longitudinal cross section was exposed. Subsequently, when the radial cross section or the longitudinal cross section is pretreated by being subjected to sputtering with platinum under the following conditions, and then observed with a SEM at a magnification of 10,000 times, when assuming that a straight line is drawn perpendicularly to the outer surface from an arbitrary point on the outer surface of the separation membrane toward the inner surface side, the length of the straight line first reaching the pore exceeding 10 nm is defined as the dense layer thickness. The extraction of pores is performed after the analysis image is binarized in image analysis software "ImageJ." When the distribution of the number of pixels is expressed by the abscissa representing the luminance in the analysis image and the ordinate representing the number of pixels in the luminance, when the number of pixels in the luminance with the highest number of pixels is A, binarization is performed in accordance with a point with small luminance among two points of luminance with the number of pixels being ½A. Furthermore, an image obtained by performing noise removal (corresponding to Despeckle in ImageJ) once on the obtained binarized image by replacing all pixels with the median value of 3×3 pixels in the vicinity of the pixel is used as an analysis image. Pore extraction was performed by an ImageJ Analyze Particles command, and the thickness of the dense layer was measured from the obtained image. The measurement was performed at ten arbitrary positions, and the average value thereof was adopted as the thickness of the dense layer. The coefficient of variation in the thickness of the dense layer was calculated by dividing the standard deviation by the average value for the thicknesses of the dense layers at the ten arbitrary positions measured and converting the average value into a 100 fraction.

Sputtering

Apparatus: (E-1010) manufactured by Hitachi High-Technologies Corporation

Deposition time: 40 seconds

Current value: 20 mA

SEM

Apparatus: (SU1510) manufactured by Hitachi High-Technologies Corporation

Acceleration voltage: 5 kV

Probe current: 30

(5) Void Larger than 10 μm in Support Layer

In the same manner as in the above-described (1), the separation membrane was frozen with liquid nitrogen, and then a stress was applied (using a razor blade, a microtome, or a broad ion beam as necessary) to cut the hollow fiber membrane such that a radial cross section or a longitudinal cross section was exposed. Subsequently, when the radial cross section or the longitudinal cross section is pretreated by being subjected to sputtering with platinum under the following conditions, and then observed with a SEM at a magnification of 2,000 times, all the pores each having a diameter of more than 10 μm, that is, all the pores each having an area of more than 78.5 μm² were extracted, and the number thereof was calculated and taken as the average pore size of the support layer. The extraction of pores is performed after binarizing the analysis image (binarizing Huang) in image analysis software "ImageJ." Furthermore, an image obtained by performing noise removal (corresponding to Despeckle in ImageJ) once on the obtained binarized image by replacing all pixels with the median value of 3×3 pixels in the vicinity of the pixel is used as an analysis image. Pore extraction was performed by an ImageJ's Analyze Particles command, and the number of obtained pores was measured from the obtained image. The measurement was performed at arbitrary five locations, and the average value thereof was adopted as voids of more than 10 μm in the support layer.

Sputtering

Apparatus: (E-1010) manufactured by Hitachi High-Technologies Corporation

Deposition time: 40 seconds

Current value: 20 mA

SEM

Apparatus: (SU1510) manufactured by Hitachi High-Technologies Corporation

Acceleration voltage: 5 kV

Probe current: 30

(6) Average Pore Size of Support Layer

The separation membrane was frozen with liquid nitrogen in the same manner as in the above (1), and then cut using a microtome so that the radial cross section of the diameter was exposed. Subsequently, when the radial cross section is pretreated by being subjected to sputtering with platinum under the following conditions, and then observed with a SEM at a magnification of 2,000 times, all the pores each having a diameter of more than 100 nm, that is, all the pores each having an area of more than 7854 nm² were extracted, and the average pore size was calculated from the average area thereof to obtain the average pore size of the support layer. The observation visual field was observed from one surface of the separation membrane with a point of (film thickness/2) μm as the center with respect to the film thickness direction, and when a similar sample was observed at a magnification of 250 times using an SEM, the length when a straight line was drawn from an arbitrary point on one surface to the other surface to have the shortest length was taken as the film thickness of the separation membrane. The extraction of pores is performed after binarizing the analysis image (binarizing Huang) in image analysis software "ImageJ." An image obtained by performing noise removal (corresponding to Despeckle in ImageJ) once on the obtained binarized image by replacing all pixels with the median value of 3×3 pixels in the vicinity of the pixel is used as an analysis image. For extraction of pores, all pores each having an area larger than 7854 nm² were extracted by an Analyze Particles command of ImageJ, and the average pore size of the support layer was calculated from the average area of the obtained pores. The measurement was performed at 5 arbitrary positions, and the average value thereof was adopted as the average pore size of the support layer.

Sputtering

Apparatus: (E-1010) manufactured by Hitachi High-Technologies Corporation

Deposition time: 40 seconds

Current value: 20 mA

SEM

Apparatus: (SU1510) manufactured by Hitachi High-Technologies Corporation

Acceleration voltage: 5 kV

Probe current: 30

(7) Ratio (RA) of Rigid Amorphous

The measurement was performed by cutting out the separation membrane. TMDSC measurement of the separation membrane was performed under the following conditions using a temperature modulation differential scanning calorimeter: Q 1000 manufactured by TA Instruments. For data processing, Universal Analysis 2000 manufactured by TA Instruments was used.

Atmosphere: Nitrogen stream (50 mL/min)

Temperature and heat quantity correction: High purity indium ($T_m$=156.61° C., $\Delta H_m$=28.71 J/g)

Temperature range: From about −40° C. to 100° C.

Heating rate: 2° C./min

Sample amount: About 5 mg

Sample container: Aluminum standard container

From the TMDSC curve of the reversible component, the specific heat difference ($\Delta C_p$) before and after the glass transition temperature of the separation membrane was determined, and the ratio (MA) of movable amorphous was calculated based on the following equation. The equation below is described in Thermal Analysis of Polymeric Materials, Springer, 2005, p 780:

$$MA\ (\%) = \Delta C_p / \Delta C_p{}^0 \times 100$$

wherein $\Delta C_p{}^0$ is a specific heat difference before and after the glass transition of completely amorphous PMP.

Subsequently, DSC measurement of the separation membrane was performed under the following conditions using Q100 manufactured by TA Instruments. For data processing, Universal Analysis 2000 manufactured by TA Instruments was used.

Atmosphere: Nitrogen stream (50 mL/min)

Temperature and heat quantity correction: High purity indium ($T_m = 156.61°$ C., $\Delta H_m = 28.71$ J/g)

Temperature range: From about 20° C. to 300° C.

Heating rate: 10° C./min

Sample amount: About 5 mg

Sample container: Aluminum standard container

The heat of fusion ($\Delta H_m$) of the separation membrane was determined from the DSC curve, and the ratio of the degree of crystallinity (C) was calculated based on the equation:

$$C\ (\%) = \Delta H_m / \Delta H_m{}^0 \times 100$$

wherein $\Delta H_m{}^0$ is a completely amorphous heat of fusion of PMP.

Using the obtained ratio (MA) of the movable amorphous phase and the degree of crystallinity (C), the ratio (RA) of the rigid amorphous phase was calculated based on Equation (1):

$$RA\ (\%) = 100 - (MA + C) \qquad (1).$$

(8) Peak Temperature of Loss Elastic Modulus (E")-Temperature Curve

The loss elastic modulus of the separation membrane was determined by viscoelasticity measurement. The hollow fiber membrane was cut into a sample having a length of 30 mm in the longitudinal direction. Using a dynamic viscoelasticity measuring device (Rheogel-E4000, manufactured by UBM), the temperature dependence of the loss elastic modulus (E") was measured while heating at a heating rate of 3° C./min at a temperature of −100° C. or more and 200° C. or less in a nitrogen atmosphere. At this time, the measurement length was 10 mm, the frequency was 10 Hz, and the tensile strain was 0.05%. The maximum value of the loss elastic modulus (E") is plotted on the ordinate and the temperature is plotted on the abscissa, and the maximum value of the loss elastic modulus (E) of 20° C. or more and 90° C. or less was defined as a peak, and the corresponding temperature was defined as the peak temperature (° C.) of the loss elastic modulus (E"). The measurement was performed three times with different samples, and the average value thereof was determined.

(9) Tensile Elastic Modulus (MPa)

The tensile elastic modulus of the separation membrane was measured under an environment of a temperature of 20° C. and a humidity of 65% using a tensile tester (Tensilon UCT-100 manufactured by ORIENTEC CORPORATION) under the conditions of a sample length of 100 mm and a tensile speed of 100 mm/min, "JIS L 1013: 2010 Chemical fiber filament yarn test method 8.10 Initial tensile resistance" and for the others, the apparent Young's modulus calculated from the initial tensile resistance was defined as a tensile elastic modulus (kgf/mm$^2$). The number of measurements was five, and the average value thereof was adopted.

(10) Porosity (%)

The yarn length L (mm) and the mass M (g) of the hollow fiber membrane vacuum-dried at 25° C. for 8 hours were measured. The density pi of the hollow fiber membrane was calculated from the equation below using the values of the outer diameter (mm) and the inner diameter (mm) measured in the above-described (1):

$$\rho_1 = M/[\pi \times \{(\text{outer diameter}/2)^2 - (\text{inner diameter}/2)^2\} \times L].$$

The porosity $\varepsilon$(%) was calculated from the equation below:

$$\varepsilon = 1 - \rho_1/\rho_2$$

wherein $\rho_2$ is the density of the polymer.

(11) Stress at 5% Elongation (F5 Value)

For the tensile elastic modulus of the separation membrane, a value obtained by dividing the tension when the sample was stretched by 5% (when the distance between chucks became 105 mm) under the conditions of a sample length of 100 mm and a tensile speed of 100 mm/min in an environment of a temperature of 25° C. and a humidity of 65% using a tensile tester (Tensilon UCT-100 manufactured by ORIENTEC CORPORATION) by the cross-sectional area (excluding the hollow portion) of the sample before measurement was taken as an F5 value (MPa). The number of measurements was set to five, and the average value thereof was determined.

(12) Orientation Degree of Outer Surface

Using FTIR (FTS-55A) manufactured by BioRad DIGI-LAB provided with a single reflection ATR attachment device, S-polarized ATR spectrum measurement was performed on the outer surface in the longitudinal direction (MD) and the direction perpendicular to the longitudinal direction (radial direction) (TD) of the resin molded product and the separation membrane which were vacuum-dried at 25° C. for 8 hours. A diamond prism was used for ATR crystal, an incident angle was 45°, the number of integrations was 64, a wire grid was used for a polarizer, and S-polarized light was used. From the obtained ATR spectrum, a band intensity ratio was calculated as an orientation parameter using one band whose band intensity changes in MD and TD. For example, in a resin molded product of PMP and a separation membrane, the strength of a band ($-CH_3$ group roll vibration) around 918 cm$^{-1}$ was measured by MD and TD of the resin molded product and the separation membrane, respectively.

Since the band intensity is strongly obtained when the vibration direction of the molecular chain coincides with the polarization direction of the incident light, the ratio of the band intensity changes in correlation with the orientation degree, and thus the orientation degree was obtained from the following formula:

The orientation degree of outer surface=[Band intensity around 918 cm$^{-1}$ in MD direction]/[Band intensity around 918 cm$^{-1}$ in TD direction].

The orientation degree was measured by normalization so that the band ($-CH$ bending vibration) intensity around 1465 cm$^{-1}$ was the same.

(13) Orientation Degree of Inner Surface

After the resin molded product and the separation membrane were frozen with liquid nitrogen in the same manner as in the above-described (1), the hollow portion of the membrane, that is, the inner surface was cut in parallel in the longitudinal direction to be exposed using a razor or a microtome, and the orientation parameter of the hollow portion, that is, the inner surface was measured using FTIR (FTS-55 A) manufactured by BioRad DIGILAB attached with a single reflection ATR attachment device in the same manner as in the above-described (12). The separation membrane sample was vacuum-dried at 25° C. for 8 hours, and S-polarized ATR spectrum measurement was performed on the inner surface in the longitudinal direction (MD) and the direction perpendicular to the longitudinal direction (radial direction) (TD) of the separation membrane sample.

A diamond prism was used for ATR crystal, an incident angle was 45°, the number of integrations was 64, a wire grid was used for a polarizer, and S-polarized light was used. From the obtained ATR spectrum, a band intensity ratio was calculated as an orientation parameter using one band whose band intensity changes in MD and TD. For example, in a resin molded product of PMP and a separation membrane, the strength of a band ($-CH_3$ group roll vibration) around $918\ cm^{-1}$ was measured by MD and TD of the resin molded product and the separation membrane, respectively. Since the band intensity is strongly obtained when the vibration direction of the molecular chain coincides with the polarization direction of the incident light, the ratio of the band intensity changes in correlation with the orientation degree, and thus the orientation degree was obtained from the formula below:

> The orientation degree inside=[Band intensity around $918\ cm^{-1}$ in MD direction]/[Band intensity around $918\ cm^{-1}$ in TD direction].

The orientation degree was measured by normalization so that the band ($-CH$ bending vibration) intensity around $1465\ cm^{-1}$ was the same.

(14) Crystal Orientation Degree: $\pi$

In a hollow fiber membrane, the hollow fiber membrane was attached to a fiber sample stage such that the longitudinal direction of the separation membrane was vertical. In a flat membrane, the film was attached to a sample stage such that the X-ray incident direction was perpendicular to the film surface. X-ray diffraction measurement ($2\theta/\theta$ scan, $\beta$ scan) was performed using an X-ray diffractometer (SmartLab for polymers manufactured by Rigaku Corporation, and CuK$\alpha$ ray). First, we confirmed that there was a peak top in the $2\theta/\theta$ scan. A diffraction pattern in which the abscissa indicates the azimuth angle $\beta$ and the ordinate indicates the diffraction intensity was obtained by scanning the sample in the direction of the azimuth angle $\beta$ while fixing the diffraction angle $2\theta$ to a peak position with high diffraction intensity in the diffraction pattern in which the abscissa indicates the diffraction angle $2\theta$ of the X-ray and the ordinate indicates the diffraction intensity. The value of $2\theta$ fixed when the sample is scanned in the azimuthal angle $\beta$ direction was the position of the diffraction peak derived from the (200) plane in the $\alpha$ crystal of PMP. In the $\alpha$ crystal of PMP, the position of the diffraction peak derived from the (200) plane was around 10°. Next, with respect to the value of $2\theta$ determined by the $2\theta/\theta$ scan, the intensity from 0° to 360° in the direction of the azimuth angle $\beta$ was measured by the $\beta$ scan to obtain the intensity distribution in the direction of the azimuth angle $\beta$ (FIG. 5).

We considered that a peak was present when the intensity ratio between the maximum peak intensity and the minimum peak intensity was 0.80 or less, or 1.25 or more, and in the intensity distribution in the azimuthal angle $\beta$ direction, the width (half width H) at a position half the peak height was obtained, and the crystal orientation degree $\pi$ was calculated by equation (2). A straight line passing through two points of the minimum value of the intensity in the $\beta$ scan was used as a baseline.

$$\text{Crystal orientation degree } \pi=(180°-H)/180° \qquad (2)$$

PMP Raw Material

The following PMPs were prepared:

PMP: TPX DX 845 (Density: $833\ kg/m^3$, MFR: 9.0 g/10 min).

Other Raw Materials

Plasticizer: Dibutyl phthalate.

Example 1

35 mass % of PMP and 65 mass % of dibutyl phthalate were supplied to a twin-screw extruder, melt-kneaded at 290° C., then introduced into a melt spinning pack at a spinning temperature of 245° C., and spun downward from the outer annular portion of the discharge spinneret having one spinneret hole (double circular tube type, discharge hole diameter: 4.6 mm, slit width: 0.45 mm). The spun resin molded product was introduced into a cooling bath and wound up with a winder so that the draft ratio was 5. At that time, the idling distance was set to 20 mm. As the filter in the melt spinning pack, a metal filter having a diameter of 200 μm was used. The wound resin molded product was immersed in isopropanol for 24 hours, and further vacuum-dried at room temperature to remove isopropanol. The obtained resin molded product was stretched at a stretching magnification of 3 times at a speed of 500 mm/min in an atmosphere of 80° C. to obtain a separation membrane.

The physical properties of the obtained separation membrane are shown in Table 1. The obtained separation membrane had a ratio RA of the rigid amorphous of 47%, a porosity of 43%, $N_2$ permeability of 48 GPU, a tensile elastic modulus of 370 MPa, and a $CO_2/N_2$ permeation coefficient $\alpha$ of 7.3, and had both high permeability and excellent strength, and low leakage properties.

Example 2

A separation membrane was obtained in the same manner as in Example 1 except that the stretching magnification was set to 4 times. As a result, as shown in Table 1, the ratio RA of the rigid amorphous structure was 49%, and the tensile elastic modulus was 395 MPa.

Example 3

A separation membrane was obtained in the same manner as in Example 1 except that the stretching magnification was set to 5 times. As a result, as shown in Table 1, the ratio RA of the rigid amorphous structure was 54%, and the tensile elastic modulus was 450 MPa.

Example 4

A separation membrane was obtained in the same manner as in Example 1 except that the coagulation bath was changed to N-methylpyrrolidone, and the stretching magnification was set to 6 times. As a result, as shown in Table 1, the ratio RA of the rigid amorphous structure was 58%, and the tensile elastic modulus was increased to 465 MPa. Furthermore, the thickness of the dense layer was 0.18 μm, and the $N_2$ permeability was increased to 220 GPU due to the thinning of the layer.

Example 5

A separation membrane was obtained in the same manner as in Example 1 except that the stretching magnification was set to 5 times and the stretching temperature was set to 60° C. As a result, as shown in Table 1, the ratio RA of the rigid amorphous structure was 50%, and the tensile elastic modulus was increased to 410 MPa.

Example 6

A separation membrane was obtained in the same manner as in Example 1 except that the stretching magnification was set to 5 times and the stretching temperature was set to 100° C. As a result, as shown in Table 1, the ratio RA of the rigid amorphous structure was 52%, and the tensile elastic modulus was increased to 415 MPa.

Example 7

A separation membrane was obtained in the same manner as in Example 1 except that PMP was set to 40 mass %, dibutyl phthalate was set to 60 mass %, and the draft ratio was set to 9. As a result, as shown in Table 1, the ratio RA of the rigid amorphous structure was 46%, and the tensile elastic modulus was reduced to 360 MPa.

Comparative Example 1

A separation membrane was obtained in the same manner as in Example 1 except that the draft ratio was set to 231 and stretching was not performed. As a result, as shown in Table 2, the ratio RA of the rigid amorphous structure was 39%, and the tensile elastic modulus was as low as 86 MPa.

Comparative Example 2

A separation membrane was obtained in the same manner as in Example 1 except that stretching was not performed. As a result, as shown in Table 2, the ratio RA of the rigid amorphous structure was 36%, and the tensile elastic modulus was as low as 92 MPa.

Comparative Example 3

A separation membrane was obtained in the same manner as in Example 1 except that spinning was performed with 100 mass % of PMP and a draft ratio of 700, air cooling was then performed, and stretching was performed at a stretching temperature of 130° C. and a stretching magnification of 2.3 times. As a result, as shown in Table 2, the porosity was 20%, and the $N_2$ permeability was as low as 3 GPU.

Comparative Example 4

When the same procedure as in Example 1 was carried out except that PMP was set to 8% by mass and dibutyl phthalate was set to 92% by mass, spinning could not be carried out due to yarn breakage.

TABLE 1-1

| | | | Example 1 | Example 2 | Example 3 | Example 4 |
|---|---|---|---|---|---|---|
| Manufacturing conditions of separation membrane | PMP | [% by weight] | 35 | 35 | 35 | 35 |
| | Plasticizer | [% by weight] | 65 | 65 | 65 | 65 |
| | Plasticizer type | [—] | Dibutyl phthalate | Dibutyl phthalate | Dibutyl phthalate | Dibutyl phthalate |
| | Draft ratio | [—] | 5 | 5 | 5 | 5 |
| | Coagulation bath type | [—] | Triacetin | Triacetin | Triacetin | N-methylpyrrolidone |
| | Solubility parameter distance between plasticizer and coagulation bath | [MPa$^{1/2}$] | 7 | 7 | 7 | 5 |
| | Solubility parameter distance between PMP and coagulation bath | [MPa$^{1/2}$] | 6 | 6 | 6 | 11 |
| | Type of washing solvent | [—] | Isopropanol | Isopropanol | Isopropanol | Isopropanol |
| | Orientation degree of outer surface of unstretched membrane | [—] | 1.2 | 1.2 | 1.2 | 1.1 |
| | Orientation degree of inner surface of unstretched membrane | [—] | 1.1 | 1.1 | 1.1 | 1.1 |
| | Orientation degree of outer surface/orientation degree of inner surface of unstretched membrane | [—] | 1.1 | 1.1 | 1.1 | 1.0 |
| | Presence or absence of stretching | [—] | Present | Present | Present | Present |
| | Stretching temperature | [° C.] | 80 | 80 | 80 | 80 |
| | Stretching magnification | [magnification] | 3.0 | 4.0 | 5.0 | 6.0 |
| | Main component | [—] | PMP | PMP | PMP | PMP |
| Result of evaluating separation membrane | Ratio RA of rigid amorphous | [%] | 47 | 49 | 54 | 58 |
| | Peak temperature of loss elastic modulus (E")-temperature curve | [° C.] | 30.4 | 31.5 | 32.3 | 33.8 |
| | Stress at 5% elongation in longitudinal direction | [MPa] | 7 | 8 | 9 | 10 |
| | Orientation degree of outer surface | [—] | 1.4 | 1.5 | 2.1 | 2.2 |
| | Orientation degree of inner surface | [—] | 1.1 | 1.3 | 1.7 | 2.0 |
| | Orientation degree of outer surface/orientation degree of inner surface | [—] | 1.2 | 1.2 | 1.2 | 1.1 |
| | Crystal orientation degree π | [—] | 0.75 | 0.80 | 0.86 | 0.93 |
| | Void of 10 μm or more in support layer | [number] | 0 | 0 | 0 | 0 |

TABLE 1-1-continued

|  |  |  |  |  |  |
|---|---|---|---|---|---|
| Average pore size of support layer | [nm] | 579 | 554 | 521 | 488 |
| Porosity | [%] | 43 | 47 | 51 | 56 |
| Dense layer thickness | [μm] | 1.31 | 0.82 | 0.51 | 0.18 |
| Dense layer position | [—] | Outer surface | Outer surface | Outer surface | Outer surface |
| Shape | [—] | Hollow fiber | Hollow fiber | Hollow fiber | Hollow fiber |
| Tensile elastic modulus | [MPa] | 370 | 395 | 450 | 465 |
| $N_2$ permeability | [GPU] | 48 | 66 | 152 | 220 |
| $CO_2/N_2$ permeation coefficient α | [—] | 7.3 | 6.9 | 6.0 | 1.8 |

|  |  | Example 5 | Example 6 | Example 7 |
|---|---|---|---|---|
| Manufacturing conditions of separation membrane | PMP | 35 | 35 | 40 |
|  | Plasticizer | 65 | 65 | 60 |
|  | Plasticizer type | Dibutyl phthalate | Dibutyl phthalate | Dibutyl phthalate |
|  | Draft ratio | 5 | 5 | 9 |
|  | Coagulation bath type | Triacetin | Triacetin | Triacetin |
|  | Solubility parameter distance between plasticizer and coagulation bath | 7 | 7 | 7 |
|  | Solubility parameter distance between PMP and coagulation bath | 6 | 6 | 6 |
|  | Type of washing solvent | Isopropanol | Isopropanol | Isopropanol |
|  | Orientation degree of outer surface of unstretched membrane | 1.2 | 1.2 | 1.4 |
|  | Orientation degree of inner surface of unstretched membrane | 1.1 | 1.1 | 1.1 |
|  | Orientation degree of outer surface/orientation degree of inner surface of unstretched membrane | 1.1 | 1.1 | 1.3 |
|  | Presence or absence of stretching | Present | Present | Present |
|  | Stretching temperature | 60 | 100 | 80 |
|  | Stretching magnification | 5.0 | 5.0 | 3.0 |
|  | Main component | PMP | PMP | PMP |
| Result of evaluating separation membrane | Ratio RA of rigid amorphous | 50 | 52 | 46 |
|  | Peak temperature of loss elastic modulus (E") -temperature curve | 32.1 | 32.2 | 30.5 |
|  | Stress at 5% elongation in longitudinal direction | 9 | 9 | 8 |
|  | Orientation degree of outer surface | 1.9 | 1.9 | 1.6 |
|  | Orientation degree of inner surface | 1.5 | 1.6 | 1.1 |
|  | Orientation degree of outer surface/orientation degree of inner surface | 1.3 | 1.2 | 1.4 |
|  | Crystal orientation degree π | 0.88 | 0.83 | 0.76 |
|  | Void of 10 μm or more in support layer | 0 | 0 | 0 |
|  | Average pore size of support layer | 533 | 542 | 588 |
|  | Porosity | 48 | 47 | 44 |
|  | Dense layer thickness | 0.52 | 0.54 | 1.35 |
|  | Dense layer position | Outer surface | Outer surface | Outer surface |
|  | Shape | Hollow fiber | Hollow fiber | Hollow fiber |
|  | Tensile elastic modulus | 410 | 415 | 360 |
|  | $N_2$ permeability | 140 | 110 | 60 |
|  | $CO_2/N_2$ permeation coefficient α | 4.0 | 7.1 | 1.5 |

TABLE 2

|  |  |  | Comparative Example 1 | Comparative Example 2 | Comparative Example 3 | Comparative Example 4 |
|---|---|---|---|---|---|---|
| Manufacturing conditions of separation membrane | PMP | [% by weight] | 35 | 35 | 100 | 8 |
|  | Plasticizer | [% by weight] | 65 | 65 | 0 | 92 |
|  | Plasticizer type | [—] | Dibutyl phthalate | Dibutyl phthalate | — | Dibutyl phthalate |
|  | Draft ratio | [—] | 231 | 5 | 700 | 5 |
|  | Coagulation bath type | [—] | Triacetin | Triacetin | — | Triacetin |
|  | Solubility parameter distance between plasticizer and coagulation bath | $[MPa^{1/2}]$ | 7 | 7 | — | 7 |

TABLE 2-continued

| | | | Comparative Example 1 | Comparative Example 2 | Comparative Example 3 | Comparative Example 4 |
|---|---|---|---|---|---|---|
| | Solubility parameter distance between PMP and coagulation bath | [MPa$^{1/2}$] | 6 | 6 | — | 6 |
| | Type of washing solvent | [—] | Isopropanol | Isopropanol | Isopropanol | — |
| | Orientation degree of outer surface of unstretched membrane | [—] | 2.3 | 1.2 | 2.8 | — |
| | Orientation degree of inner surface of unstretched membrane | [—] | 1.2 | 1.1 | 1.8 | — |
| | Orientation degree of outer surface/orientation degree of inner surface of unstretched membrane | [—] | 1.9 | 1.1 | 1.6 | — |
| | Presence or absence of stretching | [—] | Absent | Absent | Present | — |
| | Stretching temperature | [° C.] | — | — | 130 | — |
| | Stretching magnification | [magnification] | — | — | 2.3 | — |
| | Main component | [—] | PMP | PMP | PMP | PMP |
| Result of evaluating separation membrane | Ratio RA of rigid amorphous | [%] | 39 | 36 | 63 | — |
| | Peak temperature of loss elastic modulus (E")-temperature curve | [° C.] | 27.5 | 29.2 | 37.2 | — |
| | Stress at 5% elongation in longitudinal direction | [MPa] | 5 | 4 | 14 | — |
| | Orientation degree of outer surface | [—] | 2.3 | 1.2 | 2.8 | — |
| | Orientation degree of inner surface | [—] | 1.2 | 1.1 | 1.8 | — |
| | Orientation degree of outer surface/orientation degree of inner surface | [—] | 1.9 | 1.1 | 1.6 | — |
| | Crystal orientation degree π | [—] | 0.57 | 0.50 | 0.65 | — |
| | Void of 10 μm or more in support layer | [number] | 0 | 0 | 0 | — |
| | Average pore size of support layer | [nm] | 776 | 616 | 290 | — |
| | Porosity | [%] | 45 | 42 | 20 | — |
| | Dense layer thickness | | 1.80 | 2.10 | 0.60 | — |
| | Dense layer position | [—] | Outer surface | Outer surface | Outer surface | — |
| | Shape | [—] | Hollow fiber | Hollow fiber | Hollow fiber | — |
| | Tensile elastic modulus | [MPa] | 86 | 92 | 510 | — |
| | N$_2$permeability | [GPU] | 30 | 15 | 3 | — |
| | CO$_2$/N$_2$permeation coefficient α | [—] | 1.2 | 6.5 | 5.7 | — |

The separation membrane obtained in Examples 1 to 7 satisfied our requirements in all items of the ratio RA of the rigid amorphous and the porosity, and in all of them, the N$_2$ permeability was 5 GPU or more, the tensile elastic modulus was 100 MPa or more, the CO$_2$/N$_2$ separation coefficient α was 1 or more, and the separation membrane was excellent in high permeability and strength, and also had low leakage properties. On the other hand, in the separation membrane of Comparative Example 1 to 4 in which at least one of the ratio RA of the rigid amorphous phase and the porosity did not satisfy our requirements, at least one of the N$_2$ permeability, the tensile elastic modulus and the CO$_2$/N$_2$ separation coefficient α showed a low value.

INDUSTRIAL APPLICABILITY

Our separation membrane can be suitably used for separating a gas from a liquid or applying a gas to a liquid. For example, in a semiconductor manufacturing line, a liquid crystal color filter manufacturing line, an ink manufacturing of an inkjet printer, and the like, it can be suitably used for a degassed film that reduces the amount of dissolved gas in water, an aqueous solution, an organic solvent, or a resist liquid, a gas exchange film in an oxygenator as a medical application, and the like. In particular, as a degassed film, it is very useful for degassing applications of a photoresist solution and a developer used for lithography in a semiconductor manufacturing line.

The invention claimed is:

1. A separation membrane containing poly(4-methyl-1-pentene) as a main component, in which a ratio RA of a rigid amorphous defined by Equation (1) of poly(4-methyl-1-pentene) in the separation membrane is 43% or more and 60% or less, overall porosity of the separation membrane is 30% or more and 70% or less, and a dense layer is provided on at least one surface side of the separation membrane, $$RA\ (\%))=100-(MA+C) \tag{1}$$

wherein MA is a ratio of a movable amorphous, and C is crystallinity.

2. The separation membrane according to claim 1, wherein, in a loss elastic modulus (E")-temperature curve, the loss elastic modulus (E") determined by a dynamic viscoelasticity test has a peak in a temperature range of 30.0° C. or higher and 50.0° C. or lower.

3. The separation membrane according to claim 1, wherein a crystal orientation degree π of the separation membrane as measured by wide-angle X-ray radiation is 0.70 or more and less than 1.00, the crystal orientation degree π being calculated based on Equation (2), $$\text{Crystal orientation degree } π=(180°-H)/180° \tag{2}$$

wherein H is a half value width(°) of a diffraction intensity distribution in a circumferential direction of a wide-angle X-ray diffraction image.

4. The separation membrane according to claim 1, wherein the separation membrane is a gas-permeable membrane adapted to separate a gas from a liquid or dissolve a gas in a liquid.

5. The separation membrane according to claim 1, wherein the dense layer has a thickness of 0.1 $\mu$m or more and 2.0 $\mu$m or less from a surface side of the separation membrane.

6. The separation membrane according to claim 1, wherein the dense layer has voids with a diameter of less than 10 nm.

7. The separation membrane according to claim 1, wherein the ratio RA of the rigid amorphous is 50% or more and 60% or less.

8. The separation membrane according to claim 1, wherein, in a temperature-loss elastic modulus (E") curve, a loss elastic modulus (E") of the separation membrane determined by a dynamic viscoelasticity test has a peak in a temperature range of 31.0° C. or higher and 40.0° C. or lower.

9. The separation membrane according to claim 1, wherein a stress at 5% elongation (F5 value) in a longitudinal direction of the separation membrane is 5.0 MPa or more.

10. The separation membrane according to claim 1, wherein the separation membrane has a hollow fiber shape.

11. The separation membrane according to claim 1, wherein a ratio of an orientation degree of an outer surface to an orientation degree of an inner surface of the separation membrane by polarized infrared spectroscopy is 1.0 or more and 1.5 or less.

12. The separation membrane according to claim 1, wherein an orientation degree of an outer surface of the separation membrane by polarized infrared spectroscopy is 1.3 or more and 3.0 or less.

13. The separation membrane according to claim 1, wherein the separation membrane has a ratio of $CO_2$ permeability to $N_2$ permeability ($CO_2/N_2$ selectivity) of 1 or more at 100 kPa.

14. The separation membrane according to claim 1, wherein the separation membrane has a $N_2$ permeability at 100 kPa of 5 GPU or more.

15. The separation membrane according to claim 1, wherein a tensile elastic modulus of the separation membrane in a longitudinal direction is 100 MPa or more.

16. The separation membrane according to claim 1, wherein the dense layer is on an outer surface of the separation membrane.

17. A method of manufacturing the separation membrane according to claim 1, comprising (1) to (3):

(1) a preparation step of melt-kneading a resin mixture containing 10 mass % or more and 50 mass % or less of poly(4-methyl-1-pentene) and 50 mass % or more and 90 mass % or less of a plasticizer to obtain a resin composition;

(2) a molding step of melting the resin composition, discharging the resin composition from a discharge spinneret, cooling the resin composition in a cooling bath, and winding the resin composition at a draft ratio of 1 or more and 10 or less to obtain a resin molded product having an orientation degree of an outer surface of 1.0 or more and 1.5 or less, and a ratio of the orientation degree of the outer surface to the orientation degree of an inner surface of 1.0 or more and 1.5 or less; and (3) a stretching step of stretching the resin molded product with a magnification of 2 times or more and 6 times or less at 60° C. or more and 120° C. or less to obtain a stretched product.

18. The method according to claim 17, wherein in the molding step, a solvent having a three-dimensional Hansen solubility parameter distance Ra to poly(4-methyl-1-pentene) in a range of 5 or more and 13 or less and a three-dimensional Hansen solubility parameter distance Rb to the plasticizer of 4 or more and 10 or less is used for a cooling bath.

* * * * *